United States Patent
Hamm et al.

(10) Patent No.: US 10,857,771 B2
(45) Date of Patent: Dec. 8, 2020

(54) STRETCH LAMINATES

(71) Applicants: HENKEL AG & CO. KGAA, Duesseldorf (DE); HENKEL IP & HOLDING GMBH, Duesseldorf (DE)

(72) Inventors: Marc Hamm, Duesseldorf (DE); Jinyu Chen, Fanwood, NJ (US); Yuhong Hu, Belle Mead, NJ (US); Andy Swain, Chesham (GB); Jennifer Thatcher, Chesterfield, NJ (US); Torsten Lindner, Schwalbach am Taunus (DE); Matthias Morand, Schwalbach am Taunus (DE); Robert Haines Turner, Cincinnati, OH (US); Ebrahim Rezai, Cincinnati, OH (US)

(73) Assignees: HENKEL AG & CO. KGAA, Duesseldorf (DE); HENKEL IP & HOLDING GMBH, Duesseldorf (DE)

( * ) Notice: Subject to any disclaimer, the term of this patent is extended or adjusted under 35 U.S.C. 154(b) by 20 days.

(21) Appl. No.: 15/690,701

(22) Filed: Aug. 30, 2017

(65) Prior Publication Data
US 2018/0029344 A1    Feb. 1, 2018

Related U.S. Application Data

(63) Continuation of application No. PCT/US2016/019011, filed on Feb. 23, 2016.

(60) Provisional application No. 62/126,882, filed on Mar. 2, 2015.

(51) Int. Cl.
| | |
|---|---|
| C09J 123/12 | (2006.01) |
| C09J 191/06 | (2006.01) |
| C09J 193/04 | (2006.01) |
| B32B 27/12 | (2006.01) |
| B32B 27/32 | (2006.01) |
| B32B 37/12 | (2006.01) |
| B32B 5/02 | (2006.01) |
| B32B 7/12 | (2006.01) |
| C08F 10/06 | (2006.01) |
| C09J 123/14 | (2006.01) |

(52) U.S. Cl.
CPC .............. *B32B 27/32* (2013.01); *B32B 5/022* (2013.01); *B32B 7/12* (2013.01); *B32B 27/12* (2013.01); *B32B 37/12* (2013.01); *C08F 10/06* (2013.01); *C09J 123/12* (2013.01); *C09J 123/14* (2013.01); *C09J 191/06* (2013.01); *C09J 193/04* (2013.01); *B32B 2037/1215* (2013.01); *B32B 2307/51* (2013.01); *B32B 2307/72* (2013.01); *B32B 2323/10* (2013.01); *B32B 2555/02* (2013.01)

(58) Field of Classification Search
CPC ......... B32B 27/12; B32B 27/32; B32B 37/12; B32B 5/022; B32B 7/12; B32B 2037/1215; B32B 2307/51; B32B 2307/72; B32B 2323/10; B32B 2555/02; C08F 10/06; C09J 123/12; C09J 123/14; C09J 191/06; C09J 193/04
See application file for complete search history.

(56) References Cited

U.S. PATENT DOCUMENTS

| | | |
|---|---|---|
| 3,848,594 A | 11/1974 | Buell |
| 3,860,003 A | 1/1975 | Buell |
| 4,116,892 A | 9/1978 | Schwarz |
| 4,233,432 A | 11/1980 | Curtis, Jr. |
| 4,515,595 A | 5/1985 | Kievit et al. |
| 4,662,875 A | 5/1987 | Hirotsu et al. |
| 4,699,622 A | 10/1987 | Toussant et al. |
| 4,710,189 A | 12/1987 | Lash |
| 4,808,178 A | 2/1989 | Aziz et al. |
| 4,834,741 A | 5/1989 | Sabee |
| 4,846,815 A | 7/1989 | Scripps |
| 4,886,853 A | 12/1989 | Foster et al. |
| 4,892,536 A | 1/1990 | DesMarais et al. |
| 4,894,060 A | 1/1990 | Nestegard |
| 4,909,803 A | 3/1990 | Aziz et al. |
| 4,946,527 A | 8/1990 | Battrell |
| 4,990,147 A | 2/1991 | Freeland |
| 5,021,257 A | 6/1991 | Foster et al. |
| 5,037,416 A | 8/1991 | Allen et al. |
| 5,143,679 A | 9/1992 | Weber et al. |
| 5,151,092 A | 9/1992 | Buell et al. |
| 5,156,793 A | 10/1992 | Buell et al. |
| 5,167,897 A | 12/1992 | Weber et al. |

(Continued)

FOREIGN PATENT DOCUMENTS

| | | |
|---|---|---|
| CN | 1433451 A | 7/2003 |
| CN | 102449091 A | 5/2012 |

(Continued)

OTHER PUBLICATIONS

Eastotac Hydrocarbon Resins Brochure by the Eastman Company (Aug. 1992).

(Continued)

*Primary Examiner* — Irina S Zemel
*Assistant Examiner* — Jeffrey S Lenihan
(74) *Attorney, Agent, or Firm* — Sun Hee Lehmann

(57) ABSTRACT

Stretch laminate hot melt adhesives and stretch laminates are described. The stretch laminate hot melt adhesives are suitable for adhering elastic materials with inelastic substrates, and allow permanent deformation of the inelastic substrate and extensions and retractions of the elastic materials. The stretch laminate hot melt adhesive is particularly suitable for back ear lamination for disposable absorbent articles.

11 Claims, 8 Drawing Sheets

(56) References Cited

U.S. PATENT DOCUMENTS

| | | | |
|---|---|---|---|
| 5,171,628 | A | 12/1992 | Arvedson et al. |
| 5,221,274 | A | 6/1993 | Buell et al. |
| 5,256,717 | A | 10/1993 | Stauffer et al. |
| 5,269,775 | A | 12/1993 | Freeland et al. |
| 5,331,033 | A | 7/1994 | Stauffer et al. |
| 5,397,843 | A | 3/1995 | Lakshmanan et al. |
| 5,422,172 | A | 6/1995 | Wu |
| 5,454,909 | A | 10/1995 | Morganelli |
| 5,518,801 | A | 5/1996 | Chappell et al. |
| 5,554,145 | A | 9/1996 | Roe et al. |
| 5,569,234 | A | 10/1996 | Buell et al. |
| 5,580,411 | A | 12/1996 | Nease et al. |
| 6,004,306 | A | 12/1999 | Robles et al. |
| 6,120,487 | A | 9/2000 | Ashton |
| 6,329,468 | B1 | 12/2001 | Wang |
| 6,428,526 | B1 | 8/2002 | Heindel et al. |
| 6,432,098 | B1 | 8/2002 | Kline et al. |
| 6,645,569 | B2 | 11/2003 | Cramer et al. |
| 6,830,800 | B2 | 12/2004 | Curro et al. |
| 6,833,404 | B2 | 12/2004 | Quinn et al. |
| 6,863,933 | B2 | 3/2005 | Cramer et al. |
| 7,112,621 | B2 | 9/2006 | Rohrbaugh et al. |
| 7,626,073 | B2 | 12/2009 | Catalan |
| 8,431,643 | B2 | 4/2013 | Rodriguez et al. |
| 8,618,350 | B2 | 12/2013 | Mansfield |
| 2002/0039623 | A1 | 4/2002 | Faissat et al. |
| 2003/0060794 | A1 | 3/2003 | Olson |
| 2003/0096896 | A1 | 5/2003 | Wang et al. |
| 2005/0222546 | A1 | 10/2005 | Vargo et al. |
| 2006/0121252 | A1 | 6/2006 | Lightcap et al. |
| 2007/0187032 | A1 | 8/2007 | Wang |
| 2007/0249254 | A1 | 10/2007 | Mansfield |
| 2008/0081868 | A1 | 4/2008 | Jiang et al. |
| 2008/0081878 | A1 | 4/2008 | Jiang et al. |
| 2010/0059178 | A1 | 3/2010 | Jiang et al. |
| 2010/0076128 | A1 | 3/2010 | Abhari et al. |
| 2010/0310837 | A1 | 12/2010 | Bond et al. |
| 2011/0021103 | A1 | 1/2011 | Alper et al. |
| 2012/0016086 | A1 | 1/2012 | Kasper et al. |
| 2012/0149827 | A1 | 6/2012 | Hu et al. |
| 2012/0207969 | A1 | 8/2012 | Mansfield |
| 2012/0209230 | A1 | 8/2012 | Mansfield |
| 2013/0005884 | A1 | 1/2013 | Davis et al. |
| 2013/0202902 | A1 | 8/2013 | DeJesus et al. |
| 2014/0134910 | A1 | 5/2014 | Mansfield |
| 2014/0235127 | A1 | 8/2014 | DeJesus et al. |
| 2014/0378924 | A1 | 12/2014 | Turner et al. |
| 2015/0024649 | A1 | 1/2015 | Cazplewski et al. |
| 2016/0130480 | A1* | 5/2016 | Kauffman ............ C08L 23/142 428/36.1 |

FOREIGN PATENT DOCUMENTS

| | | |
|---|---|---|
| EP | 0384865 A2 | 8/1990 |
| EP | 1150833 B1 | 4/2006 |
| JP | 5-148465 A | 6/1993 |
| JP | 8-109360 A | 4/1996 |
| JP | 9-31224 A | 2/1997 |
| JP | 9-188861 A | 7/1997 |
| JP | 2003186404 A | 7/2003 |
| JP | 2013540867 A | 11/2013 |
| JP | 2014-501811 A | 1/2014 |
| RU | 2207095 C2 | 6/2003 |
| RU | 2610495 C2 | 2/2017 |
| WO | 9709393 A1 | 3/1997 |
| WO | 0153408 A1 | 7/2001 |
| WO | 03033612 A1 | 4/2003 |
| WO | 2007022372 A2 | 2/2007 |
| WO | 2008042037 A1 | 4/2008 |
| WO | 2010109018 A | 9/2010 |
| WO | 2010138142 A1 | 12/2010 |
| WO | 2011022523 A2 | 2/2011 |
| WO | 2012129489 A2 | 9/2012 |
| WO | 2013039262 A1 | 3/2013 |

OTHER PUBLICATIONS

Specialty Polymers for Adhesives and Sealants by the Exxon Chemical Company (Oct. 1990).
Litz, R.J., Developments in Ethylene-Based Hot Melt Adhesives, Adhesives Age 17(8):35-38 (1974).
Clark, T., Bookbinding with Adhesives (3rd ed. McGraw-Hill, UK 1994), p. 1.
Alger, M.S., Polymer Science Dictionary (Elsevier Applied Science, New York 1989), p. 115.
Lee, S.M., Dictionary of Composite Materials Technology (CRC Press, Technology & Engineering 1995), p. 43.
Young, R.J. & Lovell, P.A., Introduction to Polymers (2nd ed., Chapman & Hall, New York 1991), pp. 10-11, 292.
Handbook of Adhesives (ed. Irving Skeist, Van Nostrand Reinhold Co. 1977), pp. 495-498.
Kraus et al., Tack and Viscoelasticity of Block Copolymer Based Adhesives, J. Adhesion 10:221-36 (1979).
Eastman Chemical Brochure titled "World of Eastman Chemicals" dated Jan. 1989, Publication No. P-160F.
Eastman AQ Branched Polyesters Brochure dated Sep. 1997, Publication No. WA-62B.
Eastman Chemical Sales Brochure dated Feb. 1993, Publication No. WA-21.
Exxon Chemical Sales Brochure dated Mar. 1994.
Eastman Chemical Eastotac Hydrocarbon Resins dated Nov. 1994, Publication WA-3C.
Exxon Chemical Escorez Tackifiers Brochure dated Apr. 1992.

* cited by examiner

STRETCH LAMINATES

FIELD OF THE INVENTION

Disclosed are stretchable laminates, and absorbent articles comprising stretchable laminates, comprising hot melt adhesives particularly suited for stretch laminates.

BACKGROUND OF THE INVENTION

Disposable absorbent diapers are widely used by infants and incontinent individuals. In order to provide a disposable absorbent diaper which can fit a range of wearers and minimize leaks, disposable absorbent diapers often include stretch laminates. Because the wearers of disposable absorbent diapers vary in size, conventional stretch laminates are often used in the waist region and leg regions of the disposable absorbent diaper, thereby allowing the disposable absorbent diaper to fit a wide range of wearers.

A conventional stretch laminate often has at least two nonwoven materials and at least one elastic film sandwiched between the two nonwoven materials. In general, the two nonwoven materials are attached to the elastic film via an adhesive.

In order to produce stretch in materials, elastic materials can be combined while held under large strains with inelastic nonwovens (so called "live stretch"). These have been extensively used in the trade and appreciated for the textured appearance of the gathered nonwovens, but end up using large amounts of nonwoven, and thus may not be the most cost-effective route. An alternative to live stretch constructions are so called "zero-strain" constructions, where a process called "mechanical activation" or "ring rolling" is used to apply large strains to the laminate comprising an elastic layer and one or two inelastic nonwoven layers in order to permanently deform the inelastic layer of the laminate and enable the elastic layer to extend and retract.

The mechanical activation of conventional stretch laminates can be achieved by meshing the conventional stretch laminate between sets of teeth. Unfortunately, many stretch laminates incur defects as a result of the high strain rates and high percentages of strain experienced during the mechanical activation process. These issues can require the use of higher amounts of adhesives, which can increase the likelihood of adhesive bleed-through and the laminates sticking to the laminating rollers, plus increase the cost.

Therefore, there is a continuing need for a way to maximize a laminate's extensibility while still assuring survivability of the laminate, and a continuing need for stretch laminate adhesives that improve adhesion for thin substrates while decreasing substrate bleed-through and improving the aged performance.

SUMMARY OF THE INVENTION

The invention provides stretch laminate hot melt adhesives.

In one embodiment, the stretch laminate hot melt adhesive composition comprises:
(a) about 35 to about 70 weight percent of a polypropylene (co)polymer having (i) a heat of fusion less than about 15 J/g measured at 10° C./min heating and cooling rate in accordance with ASTM D3418-12 and (ii) a propylene content greater than 50% of the (co)polymer;
(b) about 2 to about 15 weight percent of a wax having (i) a heat of fusion greater than 50 J/g measured at 10° C./min heating and cooling rate in accordance with ASTM D3418-12 and (ii) a melting peak greater than 100° C. measured in accordance with ASTM D3418-12; and
(c) a tackifier.

The adhesive has (i) a storage modulus ($G'_{40}$) of about $5 \times 10^5$ to about $5 \times 10^7$ Pascal at 40° C., 10 rad/s; (ii) a storage modulus ($G'_{80}$) of about $5 \times 10^3$ to about $1 \times 10^7$ Pascal at 80° C., 10 rad/s; and (iii) a density range of about 0.75 to about 0.90 g/cm$^3$ at 160° C. measured in accordance with ASTM D1475.

Another embodiment is directed to an improved stretch laminate hot melt adhesive composition comprises:
a. about 35 to about 70 weight percent of a polypropylene (co)polymer having (i) a heat of fusion less than about 15 J/g measured at 10° C./min heating and cooling rate in accordance with ASTM D3418-12 and (ii) a propylene content greater than 50% of the (co)polymer;
b. about 2 to about 15 weight percent of a wax having (i) a heat of fusion greater than 50 J/g measured at 10° C./min heating and cooling rate in accordance with ASTM D3418-12 and (ii) a melting peak greater than 100° C. measured in accordance with ASTM D3418-12; and
c. a tackifier.

The improved stretch laminate hot melt adhesive composition is substantially free of any rubber-based polymers. The hot melt adhesive has an improved bleed-through and bond strength per unit adhesive thickness than adhesive without the above components.

Yet in another embodiment, the stretch laminate hot melt adhesive composition consists essentially of:
(a) about 35 to about 70 weight percent of a polypropylene (co)polymer having (i) a heat of fusion less than about 15 J/g measured at 10° C./min heating and cooling rate in accordance with ASTM D3418-12 and (ii) a propylene content greater than 50% of the (co) polymer;
(b) about 2 to about 15 weight percent of a wax having (i) a heat of fusion greater than 50 J/g measured at 10° C./min heating and cooling rate in accordance with ASTM D3418-12 and (ii) a melting peak greater than 100° C. measured in accordance with ASTM D3418-12; and
(c) a tackifier.

DETAILED DESCRIPTION OF THE INVENTION

Figure 1:
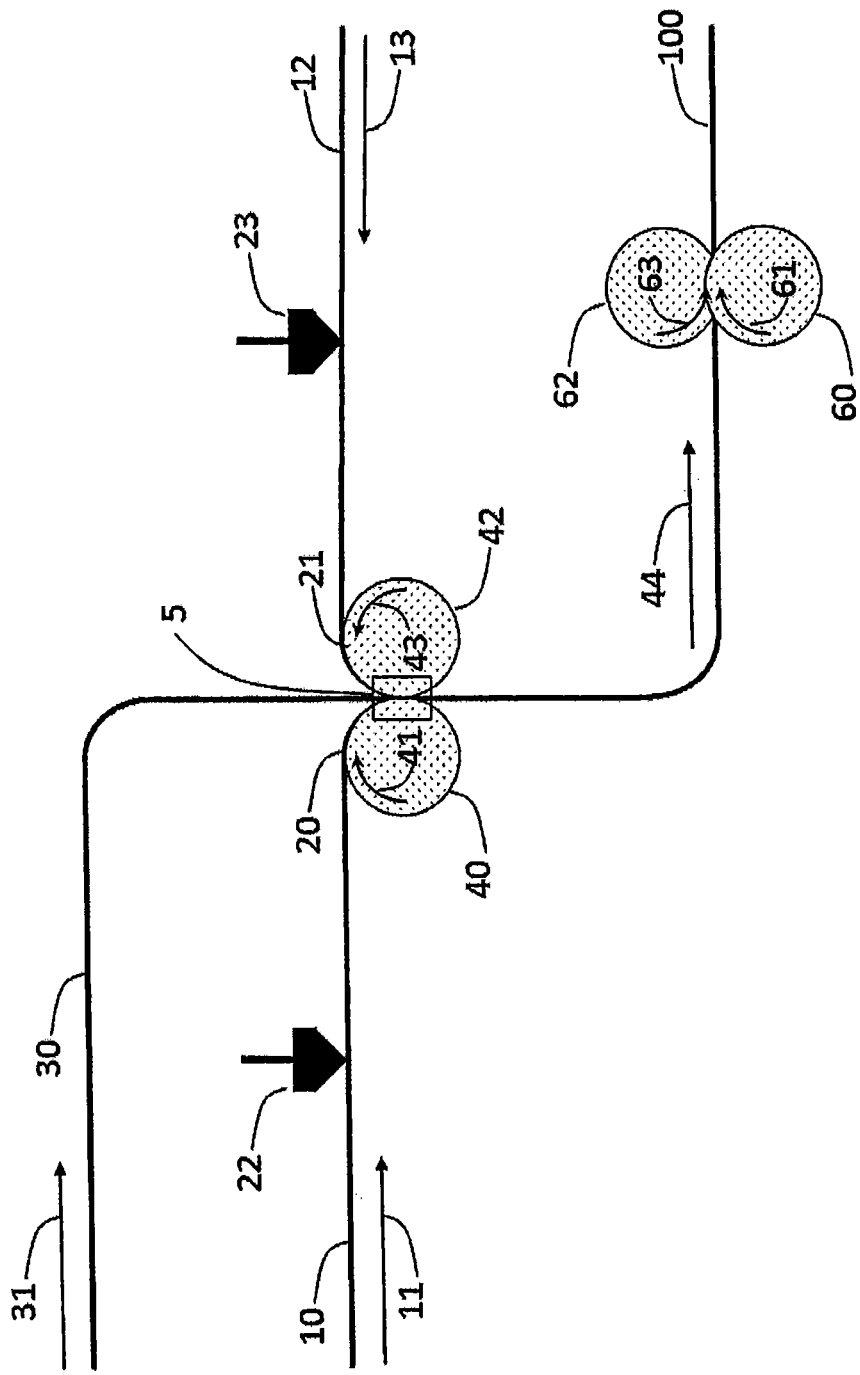
FIG. 1 is a schematic illustration of a conventional manufacturing process for making conventional stretch laminates.

"Absorbent article" refers to devices which absorb and contain body exudates and, more specifically, refers to devices which are placed against or in proximity to the body of the wearer to absorb and contain the various exudates discharged from the body. Exemplary absorbent articles include diapers, training pants, pull-on pant-type diapers (i.e., a diaper having a pre-formed waist opening and leg openings such as illustrated in U.S. Pat. No. 6,120,487), refastenable diapers or pant-type diapers, incontinence briefs and undergarments, diaper holders and liners, feminine hygiene garments such as panty liners, absorbent inserts, and the like.

"Activated" refers to a material which has been mechanically deformed so as to impart elasticity to at least a portion of the material, such as, for example by incremental stretching. As used herein the term "activation" means any process by which tensile strain produced by intermeshing teeth and grooves causes intermediate web sections to stretch or extend. Such processes have been found useful in the production of many articles including breathable films, stretch composites, apertured materials and textured materials. For nonwoven webs, the stretching can cause fiber reorientation, change in fiber denier and/or cross section, a reduction in basis weight, and/or controlled fiber destruction in the intermediate web sections. For example, a common activation method is the process known in the art as ring rolling. U.S. Pat. Nos. 6,830,800, 5,143,679, and 5,167,897 disclose examples of the activation process.

"Adhesive" refers to compositions comprising one or more thermoplastic polymers and typically one or more tackifier resins and a rheology modifier or plasticizer. Adhesives may contain 2% or more of a tackifier resin. An adhesive is generally used to join or bond two or more materials together by applying it to at least one material and then bringing it into contact with at least one other material with sufficient force and for a sufficient duration of time, that the adhesive can wet out or spread on each material to join them together (see definition of "tackifier" below).

"Adhesively bonded" or "adhesively laminated" refers to a laminate wherein an adhesive is used to bond an elastomeric member (e.g., elastomeric film) to a nonwoven(s) or to a second elastomeric member.

"Bicomponent fiber" refers to fibers or filaments consisting of material of two different compositions arranged across the cross-section of the fiber or filament. Each composition is typically delivered by a separate extruder to a spin pack designed to arrange the compositions into arrangements such as sheath-core, side-by-side, segmented pie and islands-in-the-sea. The mutual arrangement of different compositions can be beneficial in tailoring the chemical affinity between a film and a nonwoven in a laminate.

"Bleed-through" describes the phenomenon of when the applied stretch laminate adhesive seeps outside of the applied area of the stretch laminates before hardening.

"Comprise," "comprising," and "comprises" are open ended terms, each specifies the presence of what follows, e.g., a component, but does not preclude the presence of other features, e.g., elements, steps, components known in the art, or disclosed herein.

"Consisting essentially of" and "consists essentially of" are used herein to limit the scope of subject matter, such as that in a claim, to the specified materials or steps and those that do not materially affect the basic and novel characteristics of the subject matter.

As used herein, the terms "elastic," "elastomer," and "elastomeric" refer to any material which generally is able to, upon application of a tensile force, extend to an engineering strain of at least 50% without breaking or rupturing, and is able to recover substantially to its original dimensions after the deforming force has been removed.

"Engineering strain" is the change in length of a specimen (in the direction of applied stress or strain) divided by the specimen's original length (William D. Callister Jr., "Materials Science and Engineering: An Introduction", 1985, John Wiley & Sons, Inc. New York, Chichester, Brisbane, Toronto, Singapore). To calculate percent engineering strain, the engineering strain is multiplied by 100. When the word "strain" is used it means "engineering strain", unless otherwise specified.

"Strain rate" characterizes the speed at which engineering strain is applied to the material and is defined as the first time derivative of engineering strain.

"Extensible", and "extendibility" (e.g. extensible nonwoven, or extendibility of the elastomer), means that upon application of a tensile force, the width or length of the material in the relaxed position can be extended or increased, without rupture or breakage.

"Laminate" means two or more materials that are bonded to one another by methods known in the art, e.g., adhesive bonding, thermal bonding, ultrasonic bonding.

"Machine direction" (also "MD" or "length direction") as applied to a film or nonwoven material, refers to the direction that was parallel to the direction of travel of the film or nonwoven as it was processed in the forming apparatus. The "cross machine direction" (also "CD" or "width direction") refers to the direction perpendicular to the machine direction.

"Side panel," "front ear," "back ear," or "ear panel" refers to that portion of an absorbent article which is disposed adjacent to the outer cover or core or topsheet and connect a front waist edge to a back waist edge. Side panels or front/back ears have tensile properties that enable ease of the application of the article, as well as enabling the article to conform to the wearer's body. Side panels or front/back ears of the present invention may comprise a multilayer laminate. Examples of side panels that may be used in the present invention are described and illustrated in EP 1150833 (referenced as ear panels).

"Tackifier" refers to an adhesive component with a glass transition temperature in the range from about 70° C. to about 150° C. that decreases the melt viscosity of a rubbery polymer and increases the rubbery polymer's glass transition temperature and decreases the rubbery polymer's entanglement density.

"Aged" performance (e.g. "aged bond strength" or "aged engineering strain") refers to measurement taken after the sample has been stored for 4 weeks at 40° C. "Initial bond strength" performance refers to measurement taken within one day after making the sample.

In some embodiments, the present invention relates to absorbent articles comprising stretch laminates, such as may be used in, for example, stretchable side portions, back ears, waistbands, and/or stretchable outer covers. The stretchable laminates, which may comprise one or more substrates adhesively bonded to an elastic film by a hot melt adhesive, or in some embodiments two nonwovens with a film adhesively bonded in between, may achieve novel levels of stretch and elasticity due to the adhesive. The adhesive plays a critical role in, for example, a back ear laminate. It is the key contributor to product integrity and must insure that the back ear does not break during use. The adhesive also impacts the elastic performance of the laminate. It is thought that an unwanted interaction between the adhesive and the elastomeric film in the laminate is the key root cause for significant performance degradation during aging.

The stretch laminates of the present invention may comprise adhesives that improve adhesion for thin substrates while decreasing substrate bleed-through and improving the aged performance. Also, without being bound by theory, it is believed that, in the present invention, novel stretch laminates are achieved due to the realization that an adhesive with high G" allows the laminate to have better bond strength at lower basis weights of the adhesive because the adhesive can better dissipate fracture energy. It is believed that for joints between adherents of mismatched moduli (e.g. nonwoven and elastomeric film as in the present invention), an adhesive which provides mechanical compliance mitigates the concentration of stress at the edges of the joints. The ability of the adhesive to dissipate energy, as expressed by G" is one way to make the adhesive more "compliant." Another method to mitigate the stress is to apply thicker adhesive layers in the joints; however, this can lead to higher cost of the laminates and bleed-through problems.

Adhesive

The stretch laminates of the present invention may comprise a hot melt stretch adhesive that meets certain performance requirements. The stretch adhesive may have storage moduli ($G'_{40}$) of about $5 \times 10^5$ to about $5 \times 10^7$ Pascal at 40° C., 10 rad/s and a storage modulus ($G'_{80}$) of about $5 \times 10^3$ to about $1 \times 10^7$ Pascal at 80° C., 10 rad/s for good bond strength between the elastic and nonwoven substrates. The crossover temperature of the adhesive (G'=G") in the melt region may be greater than 75° C. for low bleed-through. The density of the stretch adhesive ranges from about 0.75 to about 0.90 g/cm$^3$ at 160° C., measured in accordance to ASTM D1475.

The stretch laminate hot melt adhesive composition may comprise:

(a) about 35 to about 70 weight percent of a polypropylene (co)polymer having (i) a heat of fusion less than about 15 J/g measured at 10° C./min heating and cooling rate in accordance with ASTM D3418-12; and (ii) a propylene content greater than 50% of the (co)polymer;

(b) about 2 to about 15 weight percent of a wax having (i) a heat of fusion greater than 50 J/g measured at 10° C./min heating and cooling rate in accordance with ASTM D3418-12, and (ii) a melting peak greater than 100° C. measured in accordance with ASTM D3418-12; and (c) a tackifier.

The term "polymer component" as used herein, refers to a single propylene (co)polymer or a blend of different (co)polymers produced by metallocene or Ziegler-Natta catalysis polymerization. The (co)polymer component includes block and/or random copolymers. The polypropylene (co)polymer has a propylene content greater than 50 wt % (weight percent) of the (co)polymer, based on the weight of the (co)polymer. The propylene (co)polymer is a propylene homopolymer or a propylene copolymer with at least one comonomers selected from $C_2$, $C_4$-$C_{20}$ comonomers. Preferred comonomers are ethylene, butene, hexene and octene.

The polypropylene (co)polymer has a heat of fusion less than about 15 J/g measured at 10° C./min heating and cooling rate in accordance with ASTM D3418-12. Heat of fusion is defined as the change in enthalpy for the conversion of a specified amount of a solid to a liquid at constant pressure and temperature, and reported as ΔH from the DSC measurement. Heat of fusion is directly correlated to the polymer's crystallinity. Low levels of crystallinity is desirable for the polypropylene (co)polymer of the stretch laminate hot melt adhesive.

The propylene (co)polymer is available from various manufactures under the trade name VERSIFY (Dow Chemical), VISTAMAXX (Exxon Mobil), EXACT (Exxon Mobil), TAFMER (Mitsui Petrochemical), REXENE (Rex-Tac), VESTOPLAST (Evonik), L-MODU (Idemitsu), NOTIO (Mitsui) and the like.

The polypropylene (co)polymer content in the stretch laminate hot melt adhesive ranges from about 10 to about 90 wt %, based on the total weight of the adhesive. In a preferred embodiment, the polypropylene (co)polymer content ranges from about 35 to about 70 wt %.

The stretch laminate hot melt adhesive further comprises a wax. The wax that is useful as the stretch laminate hot melt adhesive has a heat of fusion greater than 50 J/g, measured at 10° C./min heating and cooling rate in accordance with ASTM D3418-12 by DSC.

Useful waxes also have a melting peak greater than 100° C., measured at 10° C./min heating and cooling rate in accordance with ASTM D3418-12 by DSC.

Waxes suitable for use in the stretch film lamination adhesives include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. High density low molecular weight polyethylene waxes, by-product polyethylene waxes and Fischer-Tropsch waxes are conventionally referred to in the art as synthetic high melting point waxes. Useful waxes include polyethylene and polypropylene waxes, available as LICOCENE series from Clariant, SASOL from Sasol and AC series from Honeywell.

The wax component will typically be present in amounts of up to about 15 wt %, preferably about 1, 2, 3, 4, 5, 6, 7, 8, 9 or 10, wt %, based on the total weight of the stretch laminate hot melt adhesive.

The stretch film lamination adhesive further comprises a tackifier. Useful tackifying resins may include any compatible resin or mixtures thereof such as polyterpene resins; phenolic modified terpene resins and hydrogenated derivatives thereof including, for example, the resin product resulting from the condensation, in an acidic medium, of a bicyclic terpene and a phenol; aliphatic petroleum hydrocarbon resins; aromatic petroleum hydrocarbon resins and the hydrogenated derivatives thereof; and alicyclic petroleum hydrocarbon resins and the hydrogenated derivatives thereof. Examples of hydrogenated aliphatic tackifiers particularly suitable include Eastotac 130R, Escorez 5415 from Exxon Mobil Chemicals, Arkon P115 from Arakawa and Regalite 57125 from Eastman Chemical, and the like. Also included are the cyclic or acyclic $C_5$ resins and aromatic modified acyclic or cyclic resins. Examples of commercially available rosins and rosin derivatives that could be used to practice the invention include SYLVALITE RE 110L and SYLVARES RE 115 available from Arizona Chemical;

Dertocal 140 from DRT; Limed Rosin No. 1, GB-120, and Pencel C from Arakawa Chemical. Examples of commercially available phenolic modified terpene resins are Sylvares TP 2040 HM and Sylvares TP 300, both available from Arizona Chemical. Other useful tackifying resins include natural and modified rosins including, for example, as gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; copolymers and terpolymers of natured terpenes, including, for example, styrene/terpene and alpha methyl styrene/terpene.

Preferred tackifiers include $C_5$ resins, petroleum distillates, hydrogenated hydrocarbons, $C_5/C_9$ resins, $C_9$ resins, polyterpenes, rosins, hydrogenated rosins, rosin esters and mixtures there.

In one embodiment, tackifiers are synthetic hydrocarbon resins. Included are aliphatic or cycloaliphatic hydrocarbons, aromatic hydrocarbons, aromatically modified aliphatic or cycloaliphatic hydrocarbons and mixtures thereof. Non-limiting examples include aliphatic olefin derived resins such as those available from Exxon under trade name and the ESCOREZ series. Eastotac series from Eastman are also useful in the invention.

Also useful are aromatic hydrocarbon resins that are $C_9$ aromatic/aliphatic olefin-derived and available from Sartomer and Cray Valley under the trade name Norsolene and from Rutgers series of TK aromatic hydrocarbon resins. Norsolene 1100 is a low molecular weight thermoplastic hydrocarbon polymer commercially available from Cray Valley.

Alpha methyl styrene such as Kristalex F 115, 1120 and 5140 from Eastman Chemicals, Sylvares SA series from Arizona chemicals are also useful as tackifiers in the invention. Mixtures of two or more described tackifying resins may be required for some formulations.

In one embodiment, the tackifier is typically present at about 1 to about 70 wt %, more preferably from about 5 to about 65 wt %, and more preferably from about 10 to about 60 wt %, based on the total weight of the adhesive.

The stretch laminate hot melt adhesive optionally comprises a plasticizer. The plasticizer has a number average molecular weight greater than 1000 g/mol. Suitable plasticizers include polybutenes, polyisobutylene, phthalates, benzoates, adipic esters and the like. Particularly preferred plasticizers include polybutenes and polyisobutylenes, phthalates such as di-iso-undecyl phthalate (DIUP), di-iso-nonylphthalate (DINP), dioctylphthalates (DOP), mineral oil, aliphatic oils, olefin oligomers and low molecular weight polymers, vegetable oil, animal oils, paraffinic oil, naphthenic oil, aromatic oil, long chain partial ether ester, alkyl monoesters, epoxidized oils, dialkyl diesters, aromatic diesters, alkyl ether monoester and mixtures thereof.

The stretch laminate hot melt adhesives of the present invention may desirably also contain at least one stabilizer and/or at least one antioxidant. These compounds are added to protect the adhesive from degradation caused by reaction with oxygen induced by for example, heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3 (3,5-d i-tert-butyl-4-hydroxyphenyl)-propionate; n-octadecyl-3 (3,5-di-tert-butyl-4-hydroxyphenyl)-propionate; 4,4'-methylenebis(2,6-tert-butyl-phenol); 4,4'-thiobis(6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

Such antioxidants are commercially available from Ciba Specialty Chemicals and include IRGANOX® 565, 1010, 1076 and 1726 which are hindered phenols. These are primary antioxidants which act as radical scavengers and may be used alone or in combination with other antioxidants such as phosphite antioxidants like IRGAFOS® 168 available from Ciba Specialty Chemicals. Phosphite antioxidants are considered as secondary antioxidants, and are not generally used alone. These are primarily used as peroxide decomposers. Other available antioxidants are CYANOX® LTDP available from Cytec Industries and ETHANOX® 330 available from Albemarle Corp. Many such antioxidants are available either to be used alone or in combination with other such antioxidants. These compounds are added to the hot melts in small amounts, typically less than about 10 wt %, and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as pigments, dyestuffs and fillers conventionally added to hot melt adhesives may be incorporated in minor amounts, i.e., up to about 10% by weight, into the total weight of the adhesive.

The particular combination of the above polypropylene (co)polymer and the above wax(es) forms a stretch laminate hot melt adhesive suitable for activated stretch laminates. The stretch adhesive has storage moduli $G'_{40}$ in the range of about $5 \times 10^5$ to about $5 \times 10^7$ Pascal at 40° C., 10 rad/s and $G'_{80}$ in the range of about $5 \times 10^3$ to about $1 \times 10^7$ Pascal at 80° C., 10 rad/s. This range provides good bond strength for the adhesive. In one embodiment, the stretch adhesive has a storage moduli ($G'_{40}$) of about $5 \times 10^5$ to about $5 \times 10^6$ Pascal at 40° C., 10 rad/s and ($G'_{80}$) of about $5 \times 10^3$ to about $1 \times 10^6$ Pascal at 80° C., 10 rad/s. The stretch adhesive preferably also has a loss modulus $G''_{40}$ value greater than about $5 \times 10^4$ Pascal at 40° C., 10 rad/s.

In another embodiment, the density of the stretch adhesive ranges from about 0.75 to about 0.90 $g/cm^3$ at 160° C., measured in accordance to ASTM D1475. This density range allows the adhesive to have a thicker bond line than conventional stretch adhesives, at the same basis weight. It is believed that thicker bond line leads to decreased stress concentrations at the interfaces. Preferably, the density of the stretch adhesive ranges from about 0.80 to about 0.88 $g/cm^3$ at 160° C., measured in accordance to ASTM D1475.

Yet in another embodiment, the stretch adhesive has a Brookfield melt viscosity at 160° C. about 6,000 to about 20,000 cps, measured with spindle #27 in accordance with ASTM 3236-88. This ensures versatile application of the adhesive on to substrates by means of roll coating, painting, dry-brushing, dip coating, spraying, slot-coating, swirl spraying, printing (e.g., ink jet printing), flexographic, extrusion, atomized spraying, gravure (pattern wheel transfer), electrostatic, vapor deposition, fiberization and/or screen printing. Preferably, the stretch adhesive has a Brookfield melt viscosity at 160° C. about 8,000 to about 18,000 cps, measured with spindle #27 in accordance with ASTM 3236-88.

The stretch adhesive has a crossover temperature (where tan δ=1) that is greater than 75° C. in the melt region. This value predicts the likelihood of bleed-through phenomenon of the adhesive. It has been discovered that adhesives with crossover temperature higher than 75° C. have less bleed-through of the adhesive onto the substrates.

Also, the time it takes to reach the crossover temperature for the inventive stretch adhesive, when quenched from 150° C. to 20° C. by liquid nitrogen, is less than 120 seconds, preferably less than 100 seconds, more preferably less than 80 seconds. It has been discovered that adhesives that take less than 80 seconds to reach the crossover temperature set fast enough and do not bleed-through onto the lamination rolls.

A skilled artisan may measure the storage modulus (G'), crossover temperature (where tan δ=1 or G'=G'', used interchangeably) and the time it takes to reach the crossover temperatures in various ways. The storage modulus (G'), crossover temperature (tan δ=1) and the time it takes to reach the crossover temperatures reported here are described in the Examples.

Conventional stretch laminate adhesive has pressure-sensitive and elastomeric characteristics. Pressure sensitive adhesives have a Dahlquist Criterion G' value of less than $3 \times 10^5$ Pa at 25° C. The inventive stretch laminate adhesive is not a pressure-sensitive adhesive and it is not an elastomeric adhesive; nevertheless, it functions as a stretch adhesive on a stretch laminate. It has been discovered that a non-pressure sensitive and non-elastomeric adhesive can provide high cohesion and high adhesion to elastic films and nonwoven substrates without disrupting the extensibility of the stretch laminate. This non-elastomeric adhesive enables the elastic substrate to extend and retract and survives large strain exerted on the laminate.

The stretch laminate hot melt adhesive compositions are prepared by blending the components in a melt at a temperature above about 180° C. to form a homogeneous blend. Various methods of blending are known in the art and any method that produces a homogeneous blend may be used. The blend is then cooled and may be formed into pellets or blocks for storage or shipping. These pre-formed adhesives can then be reheated to apply onto substrates.

Other exemplary adhesives include any of those disclosed in U.S. Patent Application 2014/0378924.

The stretch laminate hot melt adhesive may be applied to a desired substrate by any method known in the art, and include, without limitation roll coating, painting, dry-brushing, dip coating, spraying, slot-coating, swirl spraying, printing (e.g., ink jet printing), flexographic, extrusion, atomized spraying, gravure (pattern wheel transfer), electrostatic, vapor deposition, fiberization and/or screen printing.

Advantageously, lower add-on amount of the stretch laminate adhesive can achieve similar peel strength as higher add-on amounts of the conventional, standard rubber-based stretch adhesives. Thus, the stretch adhesive has better performance per unit basis weight over standard rubber-based adhesives. Moreover, the inventive stretch adhesive has higher peel (bond) strength than conventional rubber-based stretch adhesive. In addition, the stretch laminate adhesive can maintain this high peel strength even after aging the stretch adhesive at 40° C. for 4 weeks. It is preferable that the percent change between the initial bond strength and the aged bond strength be less than about 15%, and preferably less than 10%. Moreover, the inventive stretch laminate adhesive has lower bleed-through characteristics than other stretch adhesives.

Nonwovens

The substrates of the present invention may be a nonwoven material. Nonwoven webs of material, such as nonwoven fabric webs, may comprise sheets of individual nonwoven component layers bonded together using mechanical, thermal, or chemical bonding processes. Nonwoven webs may be formed as flat, porous sheets made directly from individual fibers, from molten plastic, and/or plastic film.

Continuous and discontinuous fiber spinning technologies of molten materials and typically of thermoplastics are commonly referred to as spunmelt technologies. Spunmelt technologies may comprise both the meltblowing process and spunbonding processes. A spunbonding process comprises supplying a molten polymer, which is then extruded under pressure through a large number of orifices in a plate known as a spinneret or die. The resulting continuous fibers are quenched and drawn by any of a number of methods, such as slot draw systems, attenuator guns, or Godet rolls, for example. In the spunlaying or spunbonding process, the continuous fibers are collected as a loose web upon a moving foraminous surface, such as a wire mesh conveyor belt, for example. When more than one spinneret is used in line for forming a multi-layered web, the subsequent nonwoven component layers are collected upon the uppermost surface of the previously formed nonwoven component layer.

The meltblowing process is related to the spunbonding process for forming a layer of a nonwoven material, wherein, a molten polymer is extruded under pressure through orifices in a spinneret or a die. High velocity gas impinges upon and attenuates the fibers as they exit the die. The energy of this step is such that the formed fibers are greatly reduced in diameter and are fractured so that microfibers of indeterminate length are produced. This differs from the spunbonding process where the continuity of the fibers are generally preserved. Often meltblown nonwoven structures are added to spunbond nonwoven structures to form spunbond, meltblown ("SM") webs or spunbond, meltblown, spunbond ("SMS") webs, which are strong webs with some barrier properties.

Suitable nonwoven web materials that may be useful in the present invention also include, but are not limited to spunbond, meltblown, spunmelt, solvent-spun, electrospun, carded, film fibrillated, melt-film fibrillated, air-laid, dry-laid, wet-laid staple fibers, and other and other nonwoven web materials formed in part or in whole of polymer fibers, as known in the art. The nonwoven web may be formed predominately of polymeric fibers. In some examples, suitable non-woven fiber materials may include, but are not limited to polymeric materials such as polyolefins, polyesters, polyamide, or specifically, PET and PBT, polylactic acid (PLA), and alkyds, polyolefins, including polypropylene (PP), polyethylene (PE), and polybutylene (PB), olefinic copolymers from ethylene and propylene, elastomeric polymers including thermoplastic polyurethanes (TPU) and styrenic block-copolymers (linear and radial di- and tri-block copolymers such as various types of Kraton), polystyrenes, polyamides, PHA (polyhydroxyalkanoates) and e.g. PHB (polyhydroxubutyrate), and starch-based compositions including thermoplastic starch, for example. The above polymers may be used as homopolymers, copolymers, e.g., copolymers of ethylene and propyelene, blends, and alloys thereof.

Nonwoven fibers may be formed of, or may include as additives or modifiers, components such as aliphatic polyesters, thermoplastic polysaccharides, or other biopolymers. Further useful nonwovens, fiber compositions, formations of fibers and nonwovens and related methods are described in U.S. Pat. Nos. 6,645,569, 6,863,933, and 7,112,621.

In the present invention, the outer layers may be of a nonwoven material, such as SM (spunbond meltblown), SMS (spunbond meltblown spunbond), and SMMS (spunbond meltblown meltblown spunbond), SSS (spunbond spunbond spunbond) nonwovens. A nonwoven may be called a spunbonded nonwoven even when it includes meltblown fibers.

In some embodiments, at least one of the nonwovens in the stretchable laminate is spunbonded. In some embodiments, both nonwovens are spunbonded. In some embodiments, one of the nonwovens may be carded.

In some embodiments, a nonwoven may comprise bicomponent fibers, in some embodiments, a nonwoven may be extensible. In some embodiments, a spunbonded nonwoven may have a basis weight of, respectively, at most 14 gsm, at most 15 gsm, at most 17 gsm, at most 19 gsm, or at most 21 gsm. In some embodiments, a carded nonwoven may have a basis weight of, respectively, at most about 24 gsm, at most 25 gsm, at most 27 gsm, at most 29 gsm, or at most 31 gsm.

Films

According to the present disclosure, the stretchable laminate may comprise one or more substrates adhesively bonded to an elastic film, for example, an elastic film between two nonwoven layers. Exemplary films may be elastomeric polymers. Nonlimiting examples of elastomeric polymers include homopolymers, block copolymers, random copolymers, alternating copolymers, graft copolymers, and the like. Particularly suitable polymers for use in films exhibiting resistance to tear propagation are block copolymers, which are typically made of blocks (or segments) of distinct repeat units that each contribute to the properties of the polymer, such as those disclosed in U.S. patent application Ser. Nos. 13/026,533 and 13/673,277. One reason block copolymers are recognized as being useful, at least in part, is because the blocks of the copolymer are covalently bonded to one another and form microphase-separated structures with rubber domains that provide good extensability while the glassy end block domains provide mechanical integrity (e.g., good mechanical strength and avoidance of unwanted stress relaxation or flow). Block copolymers suitable for use herein may exhibit both elastomeric and thermoplastic characteristics. For example, the end-blocks may form domains that display stiff, rigid mechanical properties at temperatures that prevail during end use (e.g., 20° C.-40° C.), thereby adding rigidity and strength to the entire polymer. Such an end-block is sometimes referred to as a "hard block". The midblock may accommodate the relatively large deformations associated with elastomers and provides retractive force when the material is strained (i.e., stretched or extended). Such a midblock is sometimes referred to as a "soft block" or "rubbery block." Suitable block copolymers for use herein include at least one hard block (A) and at least one soft block (B). The block copolymers may have multiple blocks. In certain embodiments, the block copolymer may be an A-B-A triblock copolymer, an A-B-A-B tetrablock copolymer, or an A-B-A-B-A pentablock copolymer. Other suitable copolymers include triblock copolymers having endblocks A and A', wherein A and A' are derived from different compounds. In certain embodiments, the block copolymers may having more than one hard block and/or more than one soft block, wherein each hard block may be derived from the same or different monomers and each soft block may be derived from the same or different monomers.

Other exemplary films include any of those disclosed in U.S. Patent Application 2014/0378924. Other exemplary elastomer films may include M18-1117 and M18-1361 elastomer film commercially available from Clopay Corporation of Cincinnati, Ohio and K11-815 and CEX-826 elastomer film commercially available from Tredegar Film Products of Richmond, Va. Such materials are believed to have good elasticity properties. Exemplary elastomer films may include those with coextruded "skin" layers, and those that are skinless.

In some embodiments, the elastic film of the laminate may be no thicker than, respectively, about 50 micrometers, about 60 micrometers, or about 70 micrometers.

Activation

Laminates of the present invention may be mechanically activated by one or a combination of activating means, including, activating the laminate through intermeshing gears or plates, activating the laminate through incremental stretching, activating the laminate by ring rolling, selfing, activating the laminate by tenter frame stretching, and activating the laminate in the machine direction between nips or roll stacks operating at different speeds. Activation involves permanent mechanical displacement of fibers via rods, pins, buttons, structured screens or belts or other suitable technology. Suitable methods for activating and bonding the topsheet are disclosed in U.S. Publication No. 2010/0310837.

During the activation process, corrugated interengaging rolls are used to permanently elongate the substrate to reduce its resistance to stretch. The resulting laminate has a greater degree of stretchability in the portions that have been subjected to the activation, or ring rolling, process. Thus, this operation provides additional flexibility in achieving stretch properties in localized portions of the stretch composite. Methods for imparting stretchability to an extensible or otherwise substantially inelastic material by using corrugated interengaging rolls which incrementally stretch in the machine (MD) or the cross-machine direction (CD) and permanently deform the material are disclosed in U.S. Pat. Nos. 4,116,892; 4,834,741; 5,143,679; 5,156,793; 5,167,897; 5,422,172; and 5,518,801.

Incremental stretching rollers may be used to activate laminates in the MD, CD, at an angle, or any combination thereof. In some embodiments, the depth of engagement used for incremental stretching is about 0.05 inches, about 0.10 inches, about 0.15 inches, about 0.20 inches, or about 0.25 inches. The depth of engagement can be, for example, at least about 0.05 inches or at least about 0.10 inches. The depth of engagement can be, for example, no more than about 0.10 inches, no more than about 0.18 inches, or no more than about 0.25 inches. The pitch (i.e. tooth spacing on one roll) of the ring rolls can range from 1.5 mm to about 5 mm.

More description and examples of mechanical activation may be found in U.S. Patent Application 2014/0378924.

Fabrication of Laminate

FIG. 1 shows a detailed schematic of a manufacturing process for making stretch laminates using the "activated stretch" method, as described in US 2006/0121252 A1. A first web of nonwoven material 10 is supplied in a direction as indicated by arrow 11. A stretch adhesive is applied to said first nonwoven 10 by way of an adhesive applicator 22. A second web of nonwoven material 12 is supplied in a direction as indicated by arrow 13. Stretch adhesive is also applied to said second nonwoven 12 by way of an adhesive applicator 23. A web of elastic film 30 is supplied in a direction as indicated by arrow 31. These three webs of materials are sandwiched together between combining rolls 40, 42. Said combining rolls rotate in a direction as indicated by arrows 41, 43, respectively.

The box 5 marks the nip region. This region is enlarged in FIG. 2a, as 51. The enumeration of the items in FIG. 2a), b) follow the same scheme already used for FIG. 1. In addition FIG. 2a), b) shows the adhesive layers 70 and 72, which had been applied to the nonwoven 10 and 12 respectively.

Once these three webs of materials are sandwiched together, they rotate in the same direction 44, and they are subsequently activated between activation rolls 60, 62, illustrated in FIG. 1. These said activation rolls are also known as forming rolls and rotate in direction as indicated by arrows 61, 63, respectively.

Figure 4:
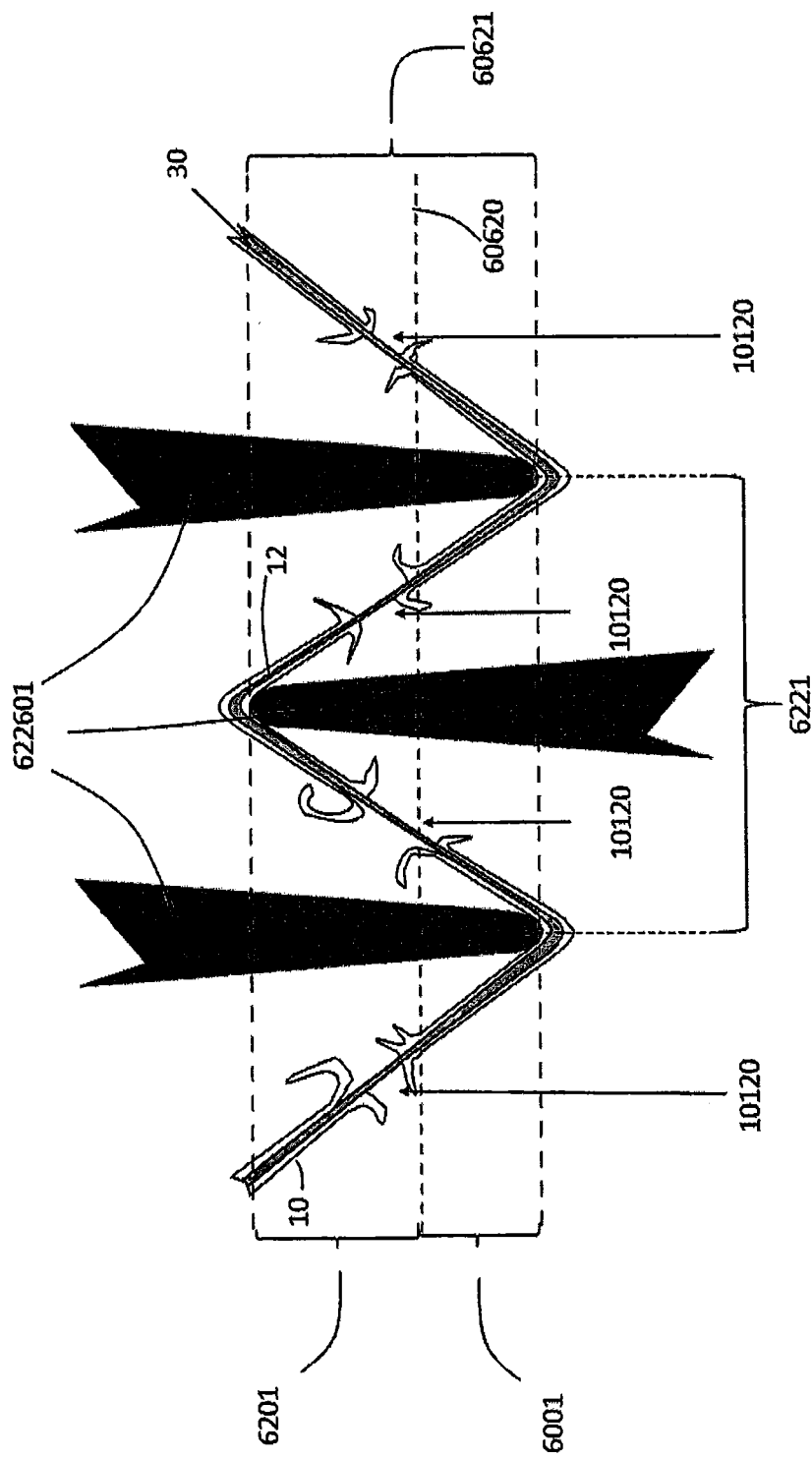
FIG. 4 is an enlarged, fragmentary, cross-sectional view showing the tip portions of the inter-engaged teeth of the forming rolls in FIG. 3 with an activated web of material positioned between the rolls which is spanning the tips of adjacent teeth.

Activation of said webs by way of activation rolls 60, 62 in e.g. FIG. 4 is also referred to as "ring rolling". A more detailed description of the "ring rolling" is found in patent US 20140378924.

After said activation, the resulting product is a stretch laminate 100. A stretch laminate used for the construction of back ears is also termed a back ear laminate.

Figure 2B:
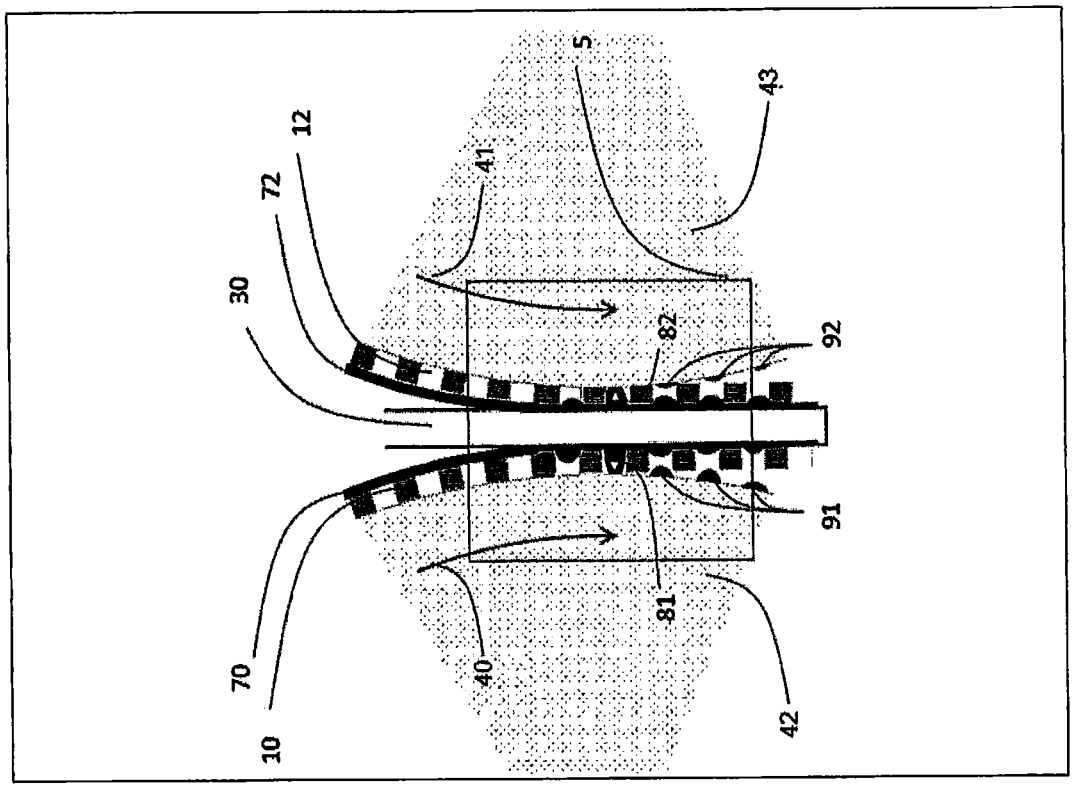
FIG. 2a provides two enlarged fragmentary view of the combining roller near the nip gap, and FIG. 2b provides the same view that shows the flow of the adhesive through the interstices of the non-woven material.
Figure 2A:
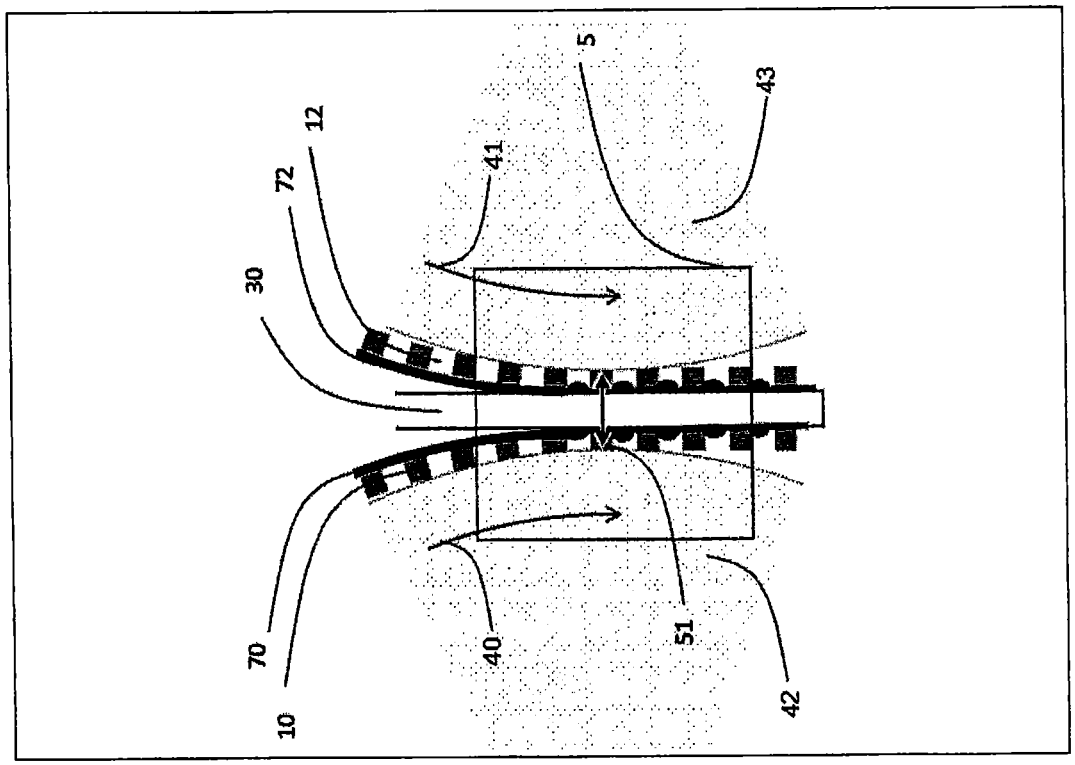

Due to the requisite higher bonding strength for stretch laminate, compared to construction applications, large quantities of the stretch adhesive are often used to adhere the substrates together; however, increasing the amount of the stretch adhesive also increases the overall cost of the wearable absorbent article, and the likelihood of corrupting the laminating process by adhesive bleed-through. The bleed-through of the stretch adhesive through the non-woven manifests itself in the laminate production as the stretch adhesive migrates from the adhesive application side to the opposing side of the combining rollers. This scenario is illustrated in FIG. 2b), where the white arrows 81 and 82 indicate the flow of the adhesive through the interstices of the non-woven material, induced by squeezing the sandwiched non-woven 10, the adhesive layer 70, the web of elastic film 30, the adhesive layer 72, and the non-woven 12 between the combining rollers 40 and 41. As the stretch adhesive makes contact with combining rollers 40 and 41 adhesive material can be transferred onto the combining rollers leading to a deposit illustrated in FIG. 2b) by item 91 and 92. This adhesive deposit may grow during the lamination and impede the production process as a tolerable threshold is exceeded. Unwanted consequences, which may arise from an adhesive deposit on the combining rollers are i) a staining of the non-woven with a tacky adhesive on the outer side of the stretch laminate, or ii) a fixture of the laminate on either of the rollers leading to the destruction of the sandwiched layers causing a breakdown of the continuous lamination process.

Presence of bleed-through can be checked either visually as an adhesive deposit on the combining rollers during the production run or, after stopping the line, by touching the combining rollers and observing a tacky feel to the combining roller surfaces. If either of these two signs is observed, the adhesive is said to bleed-through.

Without being bound to any particular theory, controlling parameters for bleed-through on conventional laminating lines are i) the adhesive material, ii) the adhesive temperature in the nip gap, and iii) the nonwoven material. Further control parameters are iv) the nip gap (distance between the combining rolls), the stretch film material, and v) the thermal properties of the combining rolls. The adhesive temperature in the nip depends on the application temperature of the adhesive and the time the adhesive travels on the line from the application points 20, 21 to the combining rollers which again depends on the line speed at which the laminate films 10, 12, and 30 move as indicated in FIG. 1, as well as the distance from the application point to the contact point with the rollers and the nip. Most of these control parameters are fixed, either by commercial constraints (line speed), the geometry of existing line equipment or as part of the defined laminate and its required properties (choice of nonwovens and film material). The selection of an adhesive that does not only meet all required mechanical performance criteria of the final laminate but has also a low propensity to bleed-through for a wide range of non-woven and film materials is of critical importance. It was found that the time at which tan δ equals 1 according to the test described below is a diagnostic criterion for preventing bleed-through.

Article

While the use of the stretch laminate is suggested in regard to certain regions of the absorbent article, it will be recognized that the stretch laminate may be used in other regions as well.

Figure 5:
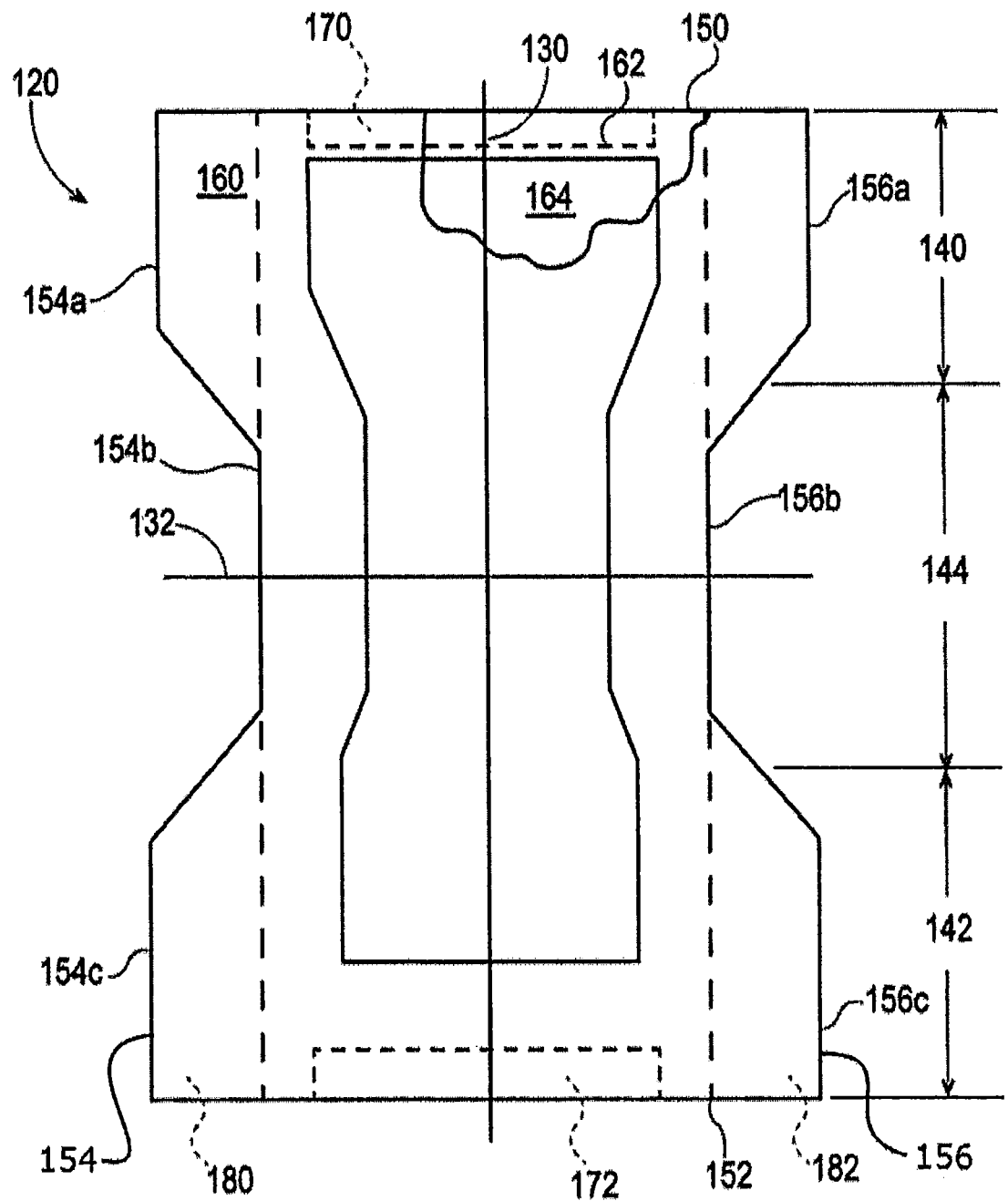
FIG. 5 is a plan view of an exemplary absorbent article including sections made of the stretch laminates of the present invention, with a section of a topsheet removed to expose an underlying absorbent core.

FIG. 5 is a plan view of an exemplary disposable absorbent article 120 in its flat, uncontracted state, i.e., without elastic-induced contraction. Portions of the article 120 have been cut away to more clearly show the underlying structure of the disposable absorbent article 120. As illustrated, the portion of the disposable absorbent article 20 that contacts the wearer faces the viewer (i.e., showing the interior or inner side of the article). The disposable absorbent article 120 has a longitudinal axis 130 and a transverse axis 132.

One end portion of the disposable absorbent article 120 is configured as a first waist region 140 of the disposable absorbent article 120. The opposite end portion is configured as a second waist region 142 of the disposable absorbent article 120. The waist regions 140 and 142 generally comprise those portions of the disposable absorbent article 120 which, when worn, encircle the waist of the wearer. The waist regions 140 and 142 may include elastic elements such that they gather about the waist of the wearer to provide improved fit and containment. An intermediate portion of the disposable absorbent article 120 is configured as a crotch region 144, which extends longitudinally between the first and second waist regions 140 and 142. The crotch region 144 is that portion of the disposable absorbent article 120 which, when the disposable absorbent article 120 is worn, is generally positioned between the legs of the wearer.

The disposable absorbent article 120 has a laterally extending first waist edge 150 in the first waist region 140 and a longitudinally opposing and laterally extending second waist edge 152 in the second waist region 142. The disposable absorbent article 120 has a first side edge 154 and a laterally opposing second side edge 156, both side edges extending longitudinally between the first waist edge 150 and the second waist edge 152. The portion of the first side edge 154 in the first waist region 140 is designated 154a, the portion in the crotch region 144 is designated 154b, and the portion in the second waist region 142 is designated 154c. The corresponding portions of the second side edge 156 are designated 156a, 156b, and 156c, respectively.

The disposable absorbent article 120 preferably comprises a water-permeable topsheet 160, a water-impermeable backsheet 162, and an absorbent assembly or core 164, which may be disposed between the topsheet 160 and the backsheet 162 with the topsheet 160 attached to the backsheet 162. The topsheet 160 may be fully or partially elasticized or may be foreshortened. Exemplary structures including elasticized or foreshortened topsheets are described in greater detail in U.S. Pat. Nos. 4,892,536; 4,990,147; 5,037,416; and 5,269,775, among others.

The absorbent article 120 may include at least one elastic waist feature 170 that helps to provide improved fit and containment. The elastic waist feature 170 may be intended to elastically expand and contract to dynamically fit the wearer's waist. The elastic waist feature 170 may extend at least longitudinally outwardly from at least one waist edge (e.g., edge 150) of the absorbent article 150 and generally forms at least a portion of the waist region (e.g., region 140) of the absorbent article 120. Diapers are often constructed so as to have two elastic waist features 170, 172, one (170) positioned in the first waist region 140 and one (172) positioned in the second waist region 142. Further, the elastic waist feature 170, 172 may be made of the stretch laminate 100 attached or joined to the backsheet 162. Alternatively, the elastic waist feature 170, 172 may be constructed as an extension of other elements of the absorbent article, such as the topsheet 160, the backsheet 162, or both the topsheet 160 and the backsheet 162 (e.g., the topsheet 160 or backsheet 162 defines one of the layers of the laminate). Other elastic waist feature constructions are described in U.S. Pat. Nos. 4,515,595; 4,710,189; 5,151,092; and 5,221,274.

The absorbent article 120 may include side panels 180, 182 attached to the backsheet 162. One or more of the side panels 180, 182 may be made from the stretch laminate. This construction may provide a more comfortable and contouring fit by initially conformably fitting the absorbent article 120 to the wearer, and sustaining this fit throughout the time of wear well past when the absorbent article 120 has been loaded with exudates, insofar as the elasticized side panels 180, 182 allow the sides of the absorbent article 120 to expand and contract. The side panels 180, 182 may also provide more effective application of the absorbent article 120 because even if the caretaker pulls one elasticized side panel 180 farther than the other (182) during application, the absorbent article 120 will "self-adjust" during wear. While the absorbent article 120 preferably has the side panels 180, 182 disposed in the second waist region 142, the absorbent article 120 may be provided with side panels disposed in the first waist region 140, or in both the front waist region 140 and the second waist region 142.

Figure 6:
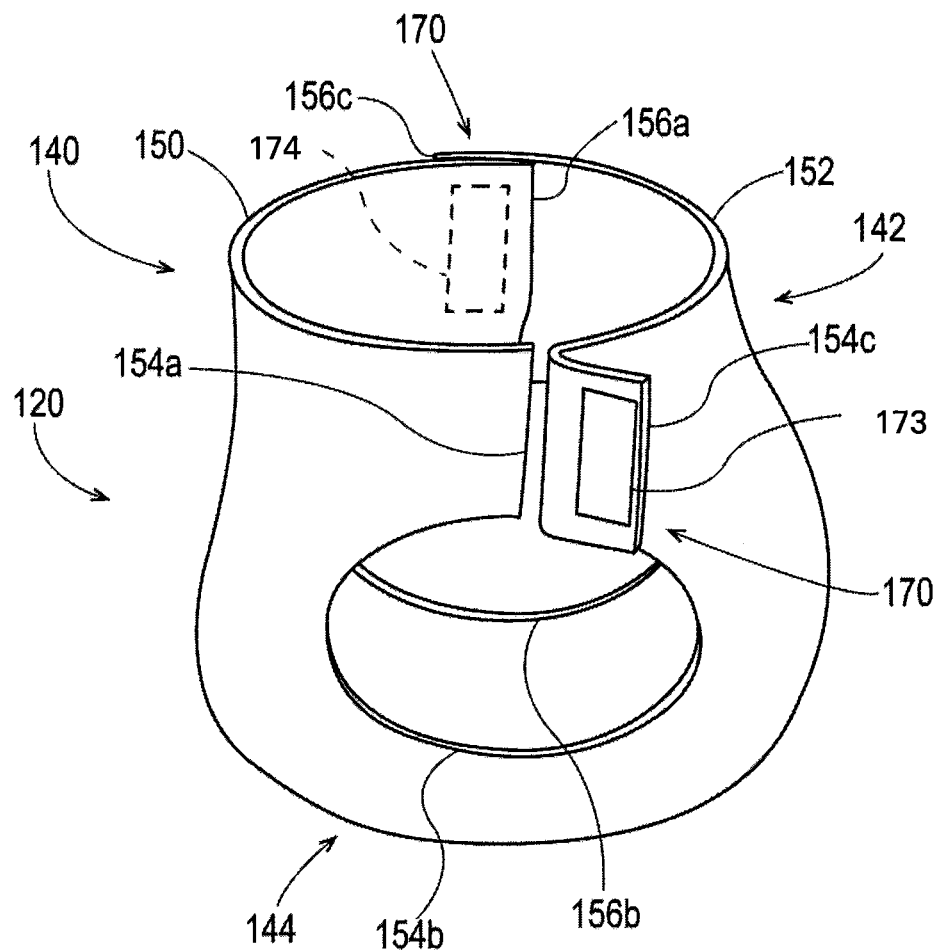
FIG. 6 is a perspective view of the absorbent article of FIG. 5 shown in its relaxed, contracted state, i.e., with the contraction induced by elastic members.

FIG. 6 illustrates the article illustrated in FIG. 5 configured to as it would be worn. The disposable absorbent article 120 may be sealed at the sides so as to be configured as illustrated in FIG. 6. However, the article 120 may instead include refastenable side seams 170 that can be used to fasten the waist regions 140, 142 together. According to one exemplary embodiment, the waist regions 140, 142 may be fastened at the sides to apply the article like a diaper. According to an exemplary embodiment, illustrated in FIG. 6, the side seams 170 may include fasteners 173 that can be used to configure the article shown, but also similar articles like a pair of pull-on training pants, or disposable pants.

As illustrated, the fasteners 173 may be disposed on the interior of the disposable absorbent article 120 in the second waist region 142 adjacent to the portion 154c of the first side edge 154 and adjacent to the portion 156c of the second side edge 156. The portion 154c of the side edge 154 is shown in an open condition, such as prior to closing and fastening or after being reopened. The portion 156c of the opposing side edge 156 is shown fastened, i.e., forming a pants configuration. In FIG. 6, the second waist region 142 overlaps the first waist region 140 when they are fastened together.

The fasteners 173 may be formed of any material and in any form that will releasably attach to the mating surface of the opposing waist region when pressed against it. For example, the primary fastening component may be a mechanical fastener that releasably engages with the mating surface, such as by means of a plurality of hooks engaging with loops formed by fibers in a nonwoven sheet. Alternatively, the primary fastening component may be an adhesive that releasably adheres to the mating surface. In fact, the fasteners may include tape tabs, hook and loop fastening components, interlocking fasteners such as tabs & slots, buckles, buttons, snaps, and/or hermaphroditic fastening components. Exemplary surface fastening systems are disclosed in U.S. Pat. Nos. 3,848,594; 4,662,875; 4,846,815; 4,894,060; 4,946,527; 5,151,092; and 5,221,274, while an exemplary interlocking fastening system is disclosed in U.S. Pat. No. 6,432,098. The fastening system may also include primary and secondary fastening systems, as disclosed in U.S. Pat. No. 4,699,622. Additionally exemplary fasteners and fastener arrangements, the fastening components forming these fasteners, and the materials that are suitable for forming fasteners are described in U.S. Published Application Nos. 2003/0060794 and 2005/0222546 and U.S. Pat. No. 6,428,526.

Still other variations are also possible. For example, the fasteners 173 may be disposed on the interior of the article 120 in the first waist region 140 such that the first waist region 140 overlaps the second waist region 142 when they are fastened together. As another example, the fasteners 174 may be disposed on the exterior of the article rather than on the interior. As a further example, the fasteners 174 may be used with a specific mating fastener surface particularly suited for cooperation with the fasteners 174 (e.g., a loop layer that works with a hook fastener, or a layer particularly treated to provide a suitable contacting surface for a specific adhesive).

Further nonlimiting examples of suitable absorbent articles for use with stretch laminates disclosed herein may be found in U.S. Pat. Nos. 3,860,003; 4,808,178; 4,909,803; 5,151,092; 5,221,274; 5,554,145; 5,569,234; 5,580,411; 6,004,306; 7,626,073; U.S. Publication No. 2007/0249254; and U.S. Ser. No. 13/026,563.

EXAMPLES

The invention will be described further in the following examples, which are included for purposes of illustration and are not intended, in any way, to be limiting of the scope of the invention.

Heat of fusion and peak melting temperature were measured with a DSC, in accordance with ASTM D3418-12.

Polymer components to the adhesives are listed in Table 1.

TABLE 1

| Polymer | PP content | comonomer | Heat of Fusion (J/g) | Melting peak (° C.) | Density at 25° C. (g/cm$^3$) |
| --- | --- | --- | --- | --- | --- |
| P1 | >50 | C2 | 11.0 | 145 | 0.86 |
| P2 | >50 | C4 | 12.5 | 105 | 0.86 |

TABLE 1-continued

| Polymer | PP content | comonomer | Heat of Fusion (J/g) | Melting peak (° C.) | Density at 25° C. (g/cm³) |
|---|---|---|---|---|---|
| P3 | 40 | C4 | 14.7 | 63 | 0.86 |
| P4 | >50 | C2 | 3.6 | 109 | 0.86 |
| P5 | 100 | — | 4.0 | 78 | 0.87 |

Adhesive samples were made in accordance with Table 2a. Added wax was selected from LICOCENE 4201, LICOCENE 6102, SASOL H1 and/or AC-9. All of the wax had a melting point greater than 100° C. The remaining portion of the adhesive was a hydrocarbon tackifier, e.g., $C_5$, hydrogenated $C_5$ and/or DCPD resin, wherein the adhesive components totaled to 100 wt %. The performance of the adhesives are listed in Table 2b.

TABLE 2a

| Adhesive | Polymer | Polymer content (%) | Wax (%) | Density at 160° C. (g/cm³) |
|---|---|---|---|---|
| CA | SIS | 29 | 0 | 0.93 |
| A1 | P3, P5 | 80 | 0 | 0.82 |
| A2 | P1, P2, P4, P5 | 60 | 0 | 0.84 |
| A3 | P1, P2, P4, P5 | 60 | 10 | 0.84 |
| A4 | P1, P2, P4, P5 | 60 | 3 | 0.84 |

Density

Density of the adhesive at 160° C. was measured with a density cup, in accordance with ASTM D 1475.

Viscosity

Viscosity was measured with a Brookfield viscometer, spindle #27 at 160° C., in accordance with ASTM 3236-88.

Dynamic Moduli: G' and G"

A TA Dynamic Mechanical Analyzer (ARES-M LS) was used to obtain the elastic moduli (G'), cross over temperature at the melt region and time to reach tan δ=1, using a temperature sweep test from Orchestrators software version 7.2.0.4. Steel parallel plates, 25 mm in diameter (316 Stainless Steel, Part #708-00966-1 from TA instruments), and separated by a gap of about 1 mm were used for this test. The sample was loaded and then heated to 160° C. and the time sweep at required temperature started once equilibrium 160° C. reached. The program test data points every 10 second intervals. The convection oven (type ARES-LN2) was flushed continuously with cool nitrogen gas. The cooling rate is at 5° C./min until reaches 0° C. The convection oven was flushed continuously with nitrogen. The frequency was maintained at 10 rad/s. The initial strain at the start of the test was 50% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below $19.62 \times 10^{-3}$ Nm the strain was decrease by 5% of the current value. If the torque was above $117.72 \times 10^{-3}$ Nm it was decreased by 25% of the current value. At torques between $19.62 \times 10^{-3}$ and $117.72 \times 10^{-3}$ Nm no change in strain was made at that temperature increment. The shear storage or elastic modulus (G') and the shear loss modulus (G") are calculated by the software from the torque and strain data. Crossover temperature was reported as the temperature where elastic modulus and loss modulus values equal to one another: tan δ=1. For the purpose of this analysis, the crossover temperature in the melt region is reported.

Time to Reach Tan δ=1

The TA Dynamic Mechanical Analyzer (ARES-M) was also used to measure the time to reach tan δ=1 in the same fashion as above using a time sweep analysis from Orchestrators software version 7.2.0.4. The sample was loaded and then heated to 150° C. to equilibrium, then the sample was quenched to 20° C. by liquid nitrogen, meanwhile the time scan measured the shear storage (or elastic) modulus (G') and the shear loss modulus (G") as a function of time. The time to reach tan δ=1, crossover temperature, was reported. For the purpose of this analysis, the time to reach the crossover temperature in the melt region is reported.

It was found that the time to reach tan δ=1 is a diagnostic criterion for the propensity of the adhesive to show bleed-through in the lamination process. The shorter this time is, the lower the propensity of the adhesive to show bleed-through.

Bleed-Through

Bleed-though was determined to be present if the adhesive formed a deposit on the combining rollers during the production of laminates or if the combining roller surfaces felt tacky-to-touch.

TABLE 2b

| Adhesive | Viscosity at 160° C. (cPs) | G' at 40° C. (Pa) | G" at 40° C. (Pa) | G' at 80° C. (Pa) | G" at 80° C. (Pa) | Crossover Temp (° C.) | Time to reach tanδ = 1 (sec) | Bleed-through |
|---|---|---|---|---|---|---|---|---|
| CA | 5650 | $2.4 \times 10^4$ | $2.4 \times 10^4$ | $5.8 \times 10^3$ | $5.0 \times 10^3$ | 81.4 | 70 | None |
| A1 | 6900 | $1.3 \times 10^4$ | $1.2 \times 10^4$ | $1.4 \times 10^3$ | $3.3 \times 10^2$ | 37.5 | 140 | Yes |
| A2 | 13500 | $4.0 \times 10^4$ | $3.4 \times 10^4$ | $2.7 \times 10^3$ | $1.5 \times 10^3$ | 56.9 | 110 | Yes |
| A3 | 7870 | $2.4 \times 10^6$ | $1.2 \times 10^5$ | $2.5 \times 10^6$ | $1.0 \times 10^5$ | 110 | 38 | — |
| A4 | 11500 | $9.2 \times 10^5$ | $3.5 \times 10^5$ | $6.7 \times 10^4$ | $6.0 \times 10^4$ | 81.9 | 63 | None |

The comparative adhesive, CA, was made with rubber block copolymer, which is a standard stretch adhesive typically used in the art. Adhesive samples without any wax, A1 and A2 had lower modulus than $5 \times 10^5$ Pa at 40° C., at 40° C., 10 rad/s. Adhesive samples A3 and A4, with a wax having a melting point greater than 100° C., had modulus values higher than $5 \times 10^5$ at 40° C., 10 rad/s. Also, bleed-through was not observed for sample A4. It was also observed that A4 had similar properties to the rubber-based adhesive: higher crossover temperature and shorter time to reach tan δ=1.

Bond Strength

Stretch laminate samples were produced by the laminate fabrication process described in the Fabrication of Laminate section and FIGS. 1-4, with adhesive add-on amounts specified in Table 3. In the process of the example described herein, one substrate was a SMS and the other was carded nonwoven. Typically, carded nonwoven has a lower bond strength to the back ear laminate than the SMS, and therefore, lower adhesive add-on is applied onto the SMS side.

The bond strength of the carded non-woven to the back ear laminate was measured with a tensile tester in Mode I T-peel configuration for initial and aged samples. A suitable tensile tester should provide a computer interface for universal tensile testing at constant rate, such as the Zwick Roell Z2.5 Materials Testing Machine (Zwick GmbH & Co. KG; August-Nagel-Str. 11; D-89079 Ulm; Germany) or equivalent. The tensile machine should be fitted with a Zwick Roell Xforce High Precision (HP) 100 N load cell (Zwick GmbH & Co. KG; August-Nagel-Str. 11; D-89079 Ulm; Germany) or equivalent.

Figure 7B:
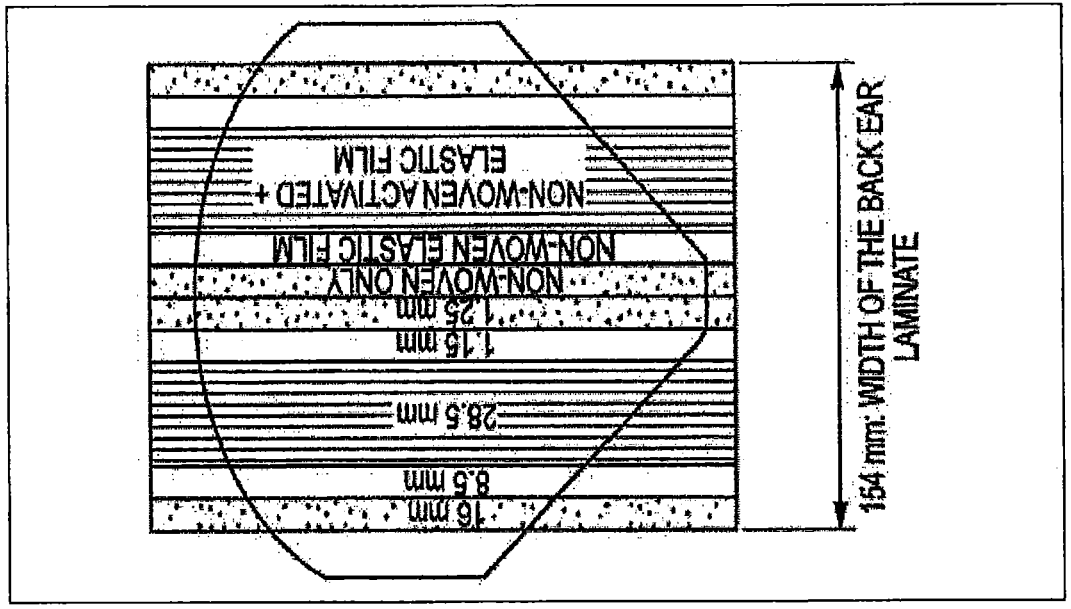
FIG. 7a provides a drawing of the die shape for cutting back ear samples from the back ear laminate, which is illustrated in FIG. 7b in conjunction with structural dimensions and the positioning of the die for cutting the back ears.
FIG. 7c of the figure illustrates, how back ear laminate samples were mounted for extension tests.

The samples tested were cut from the activated region of the stretch laminate into a substantially rectilinear shape, as illustrated by the dashed box in FIG. 7b). The cutting was carried out with a precision cutter from Thwing-Albert Instruments Co., Philadelphia, Pa. or equivalent and was sized to the sample dimensions to be tested.

Sample dimensions were selected to achieve the required strain with forces appropriate for the instrument. Sample dimensions are approximately 25.4 mm wide by approximately 100 mm long. The length of the sample were aligned with the MD direction. Shorter specimens may be used, however, if material availability precludes specimens 100 mm in length.

The samples were equilibrated at 23° C.±2° C. for a minimum of one hour before testing at that same temperature. The fixtures and grips were installed with light duty jaws (flat face or bar lines may be used) that are appropriately sized to the sample dimensions tested. The instrument was calibrated according to the manufacturer's instructions. The distance between the lines of gripping force (gauge length) was 25.4 mm, which was measured with a steel ruler held beside the grips. The force reading on the instrument was zeroed to account for the mass of the fixture and grips. The mass, length and width of the specimen were measured before sample preparation for the T-peel test and were used to calculate the basis weight of the specimen in grams per square meter (gsm). The samples (25.4 mm wide by approximately 100 mm long) were prepared for T-peel test using the following procedure:

(1) Mark the sample with a pen, making a line across the 2.54 cm width of the sample at a location 2.54 cm from the end of the sample. (2) Stretch the sample in small increments in the 6.45 cm2 area between the pen mark and the end of the sample to initiate delamination of the nonwoven fibers from the film. (3) Secure a piece of masking tape (Corporate Express, MFG #CEB1X60TN, from Paperworks, Inc at pwi-inc.com or equivalent), 5.08 cm long and 2.54 cm wide, centered across the top 2.54 cm width of sample on the end of the sample which has been stretched to initiated delamination, Apply pressure to bond the tape to the sample. The tape is placed on the 2.54 cm wide surface opposite to the side of the carded nonwoven. This tape will support the film portion of the t-peel sample after steps 4 and 5 are complete. (4) Carefully pull the fibers off of the film on the side of the carded nonwoven, in the 6.45 cm$^2$ area between the pen mark and the end of the sample. For samples that are well bonded, this can be achieved by gently abrading the sample with a rubber eraser in the approximate direction toward the pen mark. (5) Carefully peel the nonwoven off of the film to the pen mark. (6) Place a second piece of tape, 5.08 cm long and 2.54 cm wide, centered across the top 2.54 cm width of the nonwoven fibers that have been intentionally delaminated from the sample to form the nonwoven portion of the T-peel sample. To perform the T-peel test, mount the sample into the grips in a T-peel configuration with the nonwoven portion of the T-peel sample mounted in the upper grip and the film portion of the T-peel sample mounted into the bottom grip. The specimen is mounted into the grips in a manner such that there is minimal slack and the force measured is less than about 0.02 N. The crosshead moves up at a constant crosshead speed of 30.5 cm/min and the sample is peeled until the respective materials (nonwoven fibers and film) separate completely. The force and extension data are acquired at a rate of 50 Hz during the peel. The peel force (N) during the first 50 mm of extension is reported as the Mode I peel force.

A minimum of five samples was used to determine the average initial bond strength. The Laminate Bond Strength for initial and aged samples was determined as:

Laminate Bond Strength [N/cm]=Average Peel Force [N]/specimen width [cm].

Typical laminate bond strength values for a well bonded laminate used in absorbent articles of the present invention are from about 1.0 N/cm to about 2.5 N/cm for non-activated samples and from about 0.5 N/cm to about 2.0 N/cm for activated samples.

The same test was conducted for aged samples, where the sample laminates were aged for 4 weeks at 40° C. The aged samples were then equilibrated at 23° C.±2° C. for a minimum of one hour before testing at that same temperature. Again, a minimum of five samples was used to determine the average aged bond strength. Initial and aged bond strengths are reported in Table 3.

TABLE 3

| Adhesive | adhesive add-on (gsm) | | Initial Bond Strength (N/cm) | Aged Bond Strength (N/cm) | Drop of Bond Strength due to Aging (%) |
| --- | --- | --- | --- | --- | --- |
| | Carded-side | SMS-side | | | |
| CA | 9.5 | 6 | 1.5 | 1.3 | 13.3 |
| CA | 8 | 5 | 1.4 | 0.9 | 35.7 |
| A4 | 7.5 | 4.5 | 2.1 | 1.9 | 9.5 |

As shown in Table 3, bond strength increased with higher add-on levels for the comparative adhesive. The sample adhesive, A4, had similar initial bond strength to the comparative rubber based adhesive. When accounting for the thickness (as adhesive add-on), the sample adhesive had superior (higher) initial bond strength. Moreover, the sample adhesive had superior aged bond strength, even at lower add-on levels than comparative rubber based adhesive. Lower density of the sample adhesive allowed for reduced add-on amounts than the comparative rubber based adhesive while maintaining excellent bond strength.

Depth of Engagement (DOE)

Figure 3:
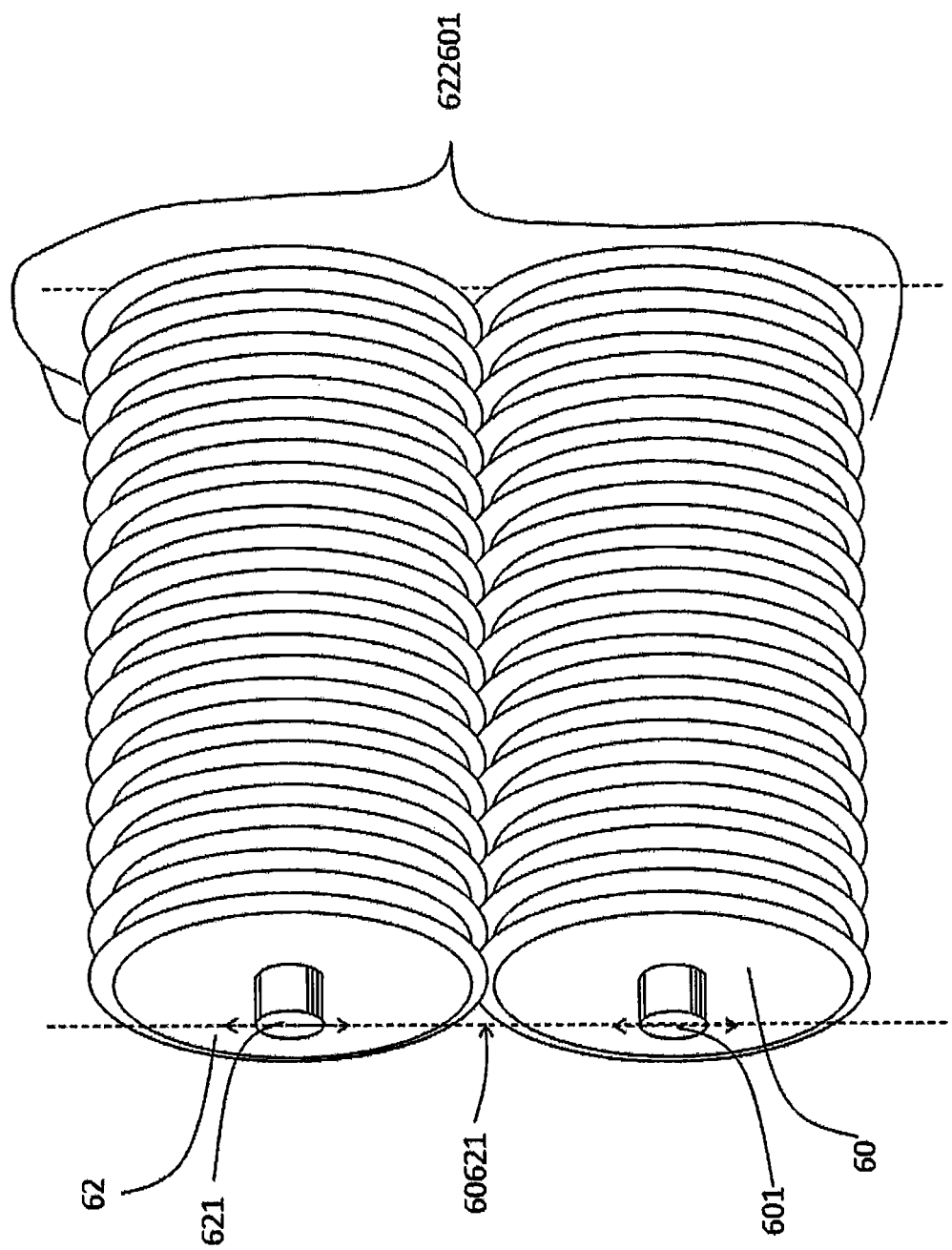
FIG. 3 is a fragmentary perspective view of a pair of closely-spaced forming rolls, each having alternating and inter-engaging peripheral teeth and grooves.

The sample laminates were activated with activation rolls similar to those depicted in FIG. 3 labeled as 60, 62. As shown, rolls 60 and 62 are carried on respective rotatable shafts 601, 621, having their axes of rotation disposed in parallel relationship. Each of rolls 60 and 62 includes a plurality of axially-spaced, side-by-side, circumferentially-extending, equally-configured teeth 622601 that can be in the form of thin fins, which are also referred to as teeth. The outermost tips of said teeth are preferably rounded, as shown in greater detail in FIG. 4, to avoid cuts or tears in the materials that pass between the rolls.

The spaces between adjacent teeth 622601 define recessed, circumferentially-extending, equally configured grooves. Thus, each of the forming rolls 60 and 62 includes a plurality of spaced teeth 622601 and alternating grooves between each pair of adjacent teeth.

FIG. 4 provides an enlarged sectional view of a cross-section through the centerlines of the forming rolls 60 and 62 in FIG. 3, in the activation process. The view in FIG. 4 focuses on the fin tips of the inter-engaged teeth 622601 and includes a laminate of a non-woven, 10, a web of elastic film, 30, and a further non-woven, 12, being strained by the imposed geometric constraint. The inter-engaging fins 622601 of the forming rolls purposefully overstretches and destroys the integrity of said non-woven layers 10, and 12 in the laminate, while preserving the integrity of the inner elastic film, 30. The targeted break-up of the non-woven is labeled as 10120 in FIG. 4. This ensures stretchability of the laminate perpendicular to the breakup of the non-woven films, which is the cross machine direction.

In this sample, the forming rolls broke the non-woven films at 19 parallel lines. The distance between these lines is determined by the pitch between the fin tips of the forming rolls 60 and 62, indicated as 60621 in FIG. 4, which was fixed at 3.81 mm.

The depth of engagement (DOE) was set by adjusting the position of both forming rolls 60 and 62, as shown in FIG. 3. The reference positions for the forming roles is defined via a reference line, illustrated as 60620 in FIG. 4. The reference position is attained as the position of the fin tips of the opposing forming rolls coincide with said reference line, which corresponds to a vanishing depth of engagement. In FIG. 4 the fin tips of forming rolls 60 and 62 are moved up by distance 6001, and down by distance 6201 relative to the reference position respectively, and distances are the pitch length of the ring roll 6221. The sum of said distances resulted in the depth of engagement, 60621, which is reported in Table 4. The strain resulting from the depth of engagement needs to be i) sufficiently large to break up the integrity of the non-wovens 10, 12, and ii) sufficiently small as not to damage the integrity of the elastic film, 30. Typical damages, which may by induced by the activation on the elastic film, 30, are pin-holes, or even a complete rupture of the elastic film, 30.

Since the adhesive couples the non-wovens 10, 12 with the elastic film, 30, in the laminate, the material properties of said adhesive need to allow an appropriate processing window for the activation of the stretch laminate. An adhesive allowing for a greater depth of engagement is preferable as it increases the processing window and with it the robustness of the process.

Engineering Strain at 9.8 N

Figure 7A:
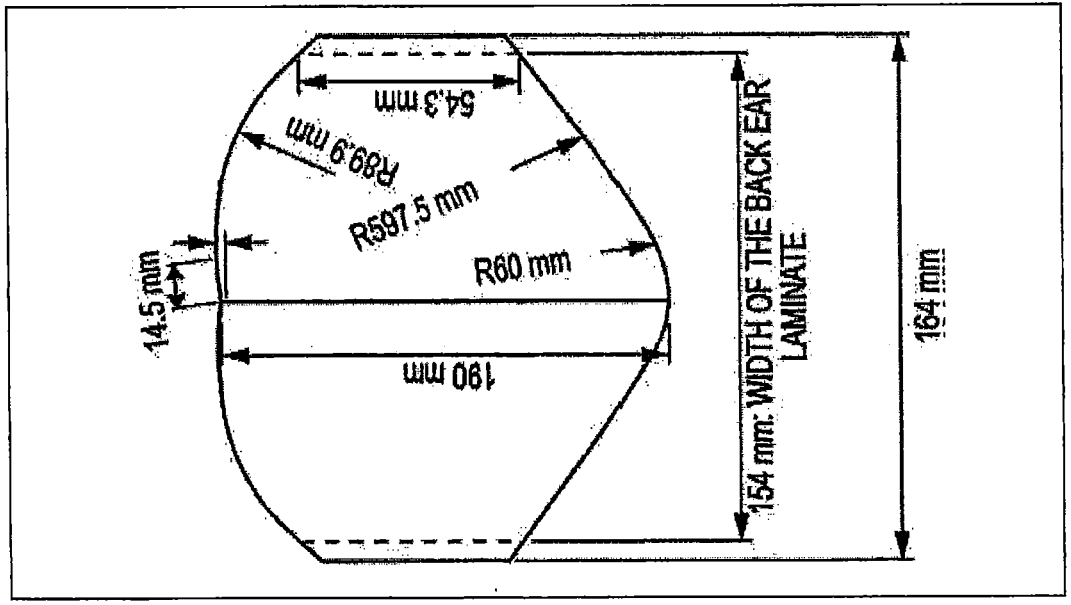

To test for the stretchability of the stretch laminate (i.e. back ear laminate) in the final product, tensile tests were conducted on the stretch laminate cut to the shape of back ear. The shape and dimension of the cutting die is specified in FIG. 7a). FIG. 7b) illustrates how the die was placed for cutting on a piece of back ear laminate at least 300 mm long in MD direction. The back ear laminate used had axial mirror symmetry about the dashed line in the center of the laminate, allowing to cut two axial symmetric back ears. In the axial symmetric arrangement there are two distinct elastic films, which only partially cover the area of the back ear laminate and the area containing the elastic films is only partially activated using two pairs of combining roll pairs described above. The distinct regions are accordingly shaded in the figure: vertical stripes indicate the activated region, also containing the elastic film, plane gray areas indicate regions, which contain a non-activated elastic film and in areas with crossed lines the nonwovens are bonded directly. The distinct areas extend in the machine direction and their cross directional dimension can be directly read from the figure.

In order to identify the line of axial symmetry the web was folded in half, length-wise, and the crease at both ends accordingly marked. The so defined centerline was then aligned with symmetry axis of the cutting die as illustrated in FIG. 7b). The cutting was executed with a hydraulic or pneumatic press that was capable to use cutting dies of minimum 203 mm×203 mm dimension and provided sufficient force to generate a clean cut through the material. Once the two ears were cut, they were separated and the extraneous material was discarded without pre-stretching the material.

The samples were run on a tensile tester with a load cell of the same specifications as those used in the testing of the laminate bond strength described above. The tensile properties were measured according to ASTM Method D882-02 with the specifications described below. The measurement were carried at a temperature of 23° C.±2° C. and about 50% relative humidity after conditioning the samples for 2 hours in that environment.

As fixtures tow rubber coated jaws with distinct sizes where used. The upper jaw had a square shape with a side length of 25.4 mm and the bottom jaw had rectangular shape of 25.4 mm height and 152.4 mm width. Both jaws operated pneumatically providing a closing pressure of 0.5-0.6 MPa.

The initial gauge length was set to 40 mm and the level of the load cell was calibrated to zero.

Figure 7C:
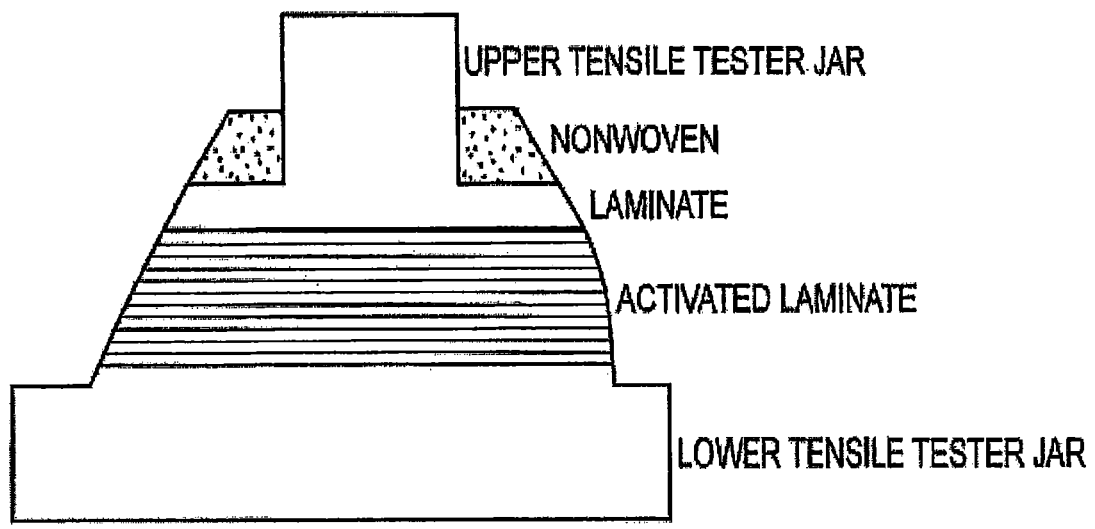

As illustrated in FIG. 7c), the long edge of the specimen was arranged in parallel to the bottom jaw. The short edge of the ear is centered with the top jaw. The vertical position was adjusted such that 18 mm of the specimen were darned in the upper jaw with the activated area being outside the clamp as illustrated. The bottom jaws were closed thereafter.

Pre-stretching of the specimen during loading and clamping needed to be avoided. If pre-load force exceeded <=0.05 N specimen were discarded.

After clamping the specimen the crosshead was moved up at a constant speed of 508 mm/min until entire specimen breaks. Results where specimen slipped from or in the jaws or broke outside the activated area (e.g. at the jaws) were discarded. As a result the stretched sample length at 9.807 N is recorded to the nearest 1 mm and used to calculate the percent engineering strain reported in Table 4, which is defined as:

Percent engineering strain=(Change in length× 100%)/Original unstretched length.

Pin-Holes

The laminates were further examined to determine if pin-holes were formed in the elastic substrates. To test for pinholes, sample sections of the back ear laminate were cut in cross-direction. The cuttings were chosen to represent continuous lamination and activation process with the length of the laminate samples adding up to 10 meters in the machine direction. These sample pieces were than manually stretched to the limit of their maximal extension in the cross-direction and then searched visually for small holes against a light source. This inspection was carried out on both elastic films in the back ear laminate and the results are reported in Table 4.

TABLE 4

| | DOE | Initial Engineering Strain at 9.8N (%) | Aged Engineering Strain at 9.8N (%) | Pin-holes |
|---|---|---|---|---|
| CA | 5.25 mm + 5.75 mm | 104 | 95 | No |
| CA | 5.75 mm + 6.25 mm | N/A | N/A | Yes |
| A4 | 5.75 mm + 6.25 mm | 112 | 90 | No |

Extensibility corresponding to at least about 70% engineering strain at 9.8 N are typically expected for these specimen. In this light the stretch laminates made with sample adhesive A4 had similar extensions to the rubber based comparative adhesive CA, both at initial and aged states. Moreover, the sample adhesive A4 allowed for deeper DOE without forming pinholes in the elastic substrates.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A stretch laminate hot melt adhesive composition consisting of:
   (a) about 35 to about 70 weight percent of a propylene (co)polymer of:
      (a1) propylene homopolymer having (i) a heat of fusion less than about 15 J/g measured at 10° C./min heating and cooling rate in accordance with ASTM D3418-12,
   and/or
      (a2) a propylene copolymer with a comonomer selected from ethylene, butene, hexene, octene, or mixtures thereof having (i) a heat of fusion less than about 15 J/g measured at 10° C./min heating and cooling rate in accordance with ASTM D3418-12 and (ii) a propylene content greater than 50% of the copolymer;
   (b) about 2 to about 10 weight percent of a polyethylene or polypropylene wax having (i) a heat of fusion greater than 50 J/g measured at 10° C./min heating and cooling rate in accordance with ASTM D3418-12 and (ii) a melting peak greater than 100° C. measured in accordance with ASTM D3418-12;
   (c) a tackifier; and
   (d) additives selected from one or more of pigments, dyestuffs, fluorescing agents, stabilizers, antioxidants, and fillers.

2. The adhesive of claim 1, wherein the heat of fusion of the wax is greater than 100 J/g.

3. The adhesive of claim 1, wherein the tackifier is selected from $C_5$ resins, petroleum distillates, hydrogenated hydrocarbons, $C_5/C_9$ resins, $C_9$ resins, polyterpenes, rosins, hydrogenated rosins, rosin esters and mixtures there.

4. The adhesive of claim 1, wherein the adhesive has a loss modulus (G") of at least about $5 \times 10^4$ Pascal at 40° C., 10 rad/s.

5. The adhesive of claim 1, wherein the adhesive has a Brookfield melt viscosity of about 6,000 to about 20,000 cps at 160° C., measured with spindle #27 in accordance with ASTM 3236-88.

6. The adhesive of claim 1, wherein the adhesive has a storage modulus ($G'_{40}$) of about $5 \times 10^5$ to about $5 \times 10^6$ Pascal at 40° C., 10 rad/s and ($G'_{80}$) of about $5 \times 10^3$ to about $1 \times 10^6$ Pascal at 80° C., 10 rad/s.

7. The adhesive of claim 1, wherein the adhesive has a density of range of about 0.80 to about 0.88 g/cm$^3$ at 160° C. measured in accordance with ASTM D1475.

8. The adhesive of claim 1, wherein the adhesive is characterized by a percent change between an initial bond strength and an aged bonded strength that is less than about 15%, wherein the initial bond strength is measured at 23° C. within 24 hours, and wherein the aged bond strength is measured at 23° C. after aging the adhesive for 4 weeks at 40° C.

9. The adhesive of claim 8, wherein the adhesive is characterized by a percent change between the initial bond strength and the aged bonded strength that is less than about 10%.

10. The adhesive of claim 1, wherein the adhesive is characterized by a time to reach tan δ=1 of less than 100 seconds.

11. The adhesive of claim 1, wherein the adhesive is characterized by a crossover temperature (tan δ=1) in the melt region of greater than 75° C.

* * * * *

UNITED STATES PATENT AND TRADEMARK OFFICE
CERTIFICATE OF CORRECTION

| | | |
|---|---|---|
| PATENT NO. | : 10,857,771 B2 | Page 1 of 1 |
| APPLICATION NO. | : 15/690701 | |
| DATED | : December 8, 2020 | |
| INVENTOR(S) | : Marc Hamm et al. | |

It is certified that error appears in the above-identified patent and that said Letters Patent is hereby corrected as shown below:

In the Specification

Column 6 Line 62 change "Regalite 57125 from Eastman Chemical" to --Regalite S7125 from Eastman Chemical--.

Column 22 Line 37 change "specimen were darned" to --specimen were clamped--.

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*